US007933712B2

(12) United States Patent
Ishizuka et al.

(10) Patent No.: US 7,933,712 B2
(45) Date of Patent: Apr. 26, 2011

(54) DEFECTIVE INJECTION DETECTION DEVICE AND FUEL INJECTION SYSTEM HAVING THE SAME

(75) Inventors: Koji Ishizuka, Chita-gun (JP); Kenichiro Nakata, Anjo (JP)

(73) Assignee: DENSO Corporation, Kariya (JP)

(*) Notice: Subject to any disclaimer, the term of this patent is extended or adjusted under 35 U.S.C. 154(b) by 206 days.

(21) Appl. No.: 12/236,882

(22) Filed: Sep. 24, 2008

(65) Prior Publication Data

US 2009/0088951 A1 Apr. 2, 2009

(30) Foreign Application Priority Data

Oct. 2, 2007 (JP) ................................ 2007-258512

(51) Int. Cl.
*G06F 19/00* (2011.01)

(52) U.S. Cl. ...... 701/114; 123/479; 123/690; 73/114.45

(58) Field of Classification Search .......... 701/103-105, 701/107, 114, 115; 123/479, 480, 690; 73/114.45, 73/114.51
See application file for complete search history.

(56) References Cited

U.S. PATENT DOCUMENTS 3,919,885 A * 11/1975 Kaireit ....................... 73/114.45
5,848,581 A * 12/1998 Hirose et al. .................. 123/357
5,896,841 A * 4/1999 Nemoto et al. ............... 123/381
6,073,608 A * 6/2000 Krieger et al. ................ 123/299
6,088,647 A * 7/2000 Hemberger et al. .......... 701/104
6,138,638 A * 10/2000 Morikawa ..................... 123/295
6,209,521 B1 * 4/2001 Rembold et al. .............. 123/456
7,137,294 B2 * 11/2006 Eser et al. .................. 73/114.51
2008/0228374 A1 9/2008 Ishizuka et al.
2009/0055084 A1 2/2009 Ishizuka et al.
2009/0056676 A1 3/2009 Nakata et al.
2009/0056677 A1 3/2009 Nakata et al.
2009/0056678 A1 3/2009 Nakata et al.
2009/0063010 A1 3/2009 Nakata et al.
2009/0063011 A1 3/2009 Nakata et al.
2009/0063012 A1 3/2009 Nakata et al.
2009/0063013 A1 3/2009 Nakata et al.

(Continued)

FOREIGN PATENT DOCUMENTS

JP 6-272600 9/1994

OTHER PUBLICATIONS

U.S. Appl. No. 11/930,668 of Ishizuka, filed Oct. 31, 2007.

(Continued)

*Primary Examiner* — John T Kwon
(74) *Attorney, Agent, or Firm* — Nixon & Vanderhye P.C.

(57) ABSTRACT

A pressure sensor is located in a fuel passage, which extends from a pressure-accumulation vessel to a nozzle hole of a fuel injection valve. The pressure sensor is located closer to a nozzle hole than the pressure-accumulation vessel for detecting pressure fluctuated by injection of fuel through the nozzle hole. An instruction signal output unit outputs an injection instruction signal so as to instruct an injection mode of fuel to the fuel injection valve. A defective injection determination unit determines whether a detected pressure of the fuel pressure sensor is fluctuated in a fluctuation mode in a range assumed from the injection instruction signal. The defective injection determination unit determines that a defective injection occurs when determining that the detected pressure is out of the fluctuation mode in the assumed range.

54 Claims, 6 Drawing Sheets

U.S. PATENT DOCUMENTS

| | | | |
|---|---|---|---|
| 2009/0063016 | A1 | 3/2009 | Nakata et al. |
| 2009/0082940 | A1 | 3/2009 | Ishizuka et al. |
| 2009/0082941 | A1 | 3/2009 | Nakata et al. |
| 2009/0084356 | A1 | 4/2009 | Nakata et al. |
| 2009/0084357 | A1 | 4/2009 | Nakata et al. |
| 2009/0107225 | A1 | 4/2009 | Ishizuka et al. |
| 2009/0107227 | A1 | 4/2009 | Ishizuka et al. |
| 2009/0112444 | A1 | 4/2009 | Ishizuka et al. |
| 2009/0112447 | A1 | 4/2009 | Ishizuka et al. |

OTHER PUBLICATIONS

U.S. Appl. No. 12/179,235 of Ishizuka, filed Jul. 24, 2008.
U.S. Appl. No. 12/186,038 of Nakata, filed Aug. 5, 2008.
U.S. Appl. No. 12/187,638 of Nakata, filed Aug. 7, 2008.
U.S. Appl. No. 12/189,376 of Nakata, filed Aug. 11, 2008.
U.S. Appl. No. 12/194,917 of Nakata filed Aug. 20, 2008.
U.S. Appl. No. 12/195,609 of Nakata filed Aug. 21, 2008.
U.S. Appl. No. 12/194,130 of Nakata filed Aug. 19, 2008.
U.S. Appl. No. 12/197,447 of Nakata filed Aug. 25, 2008.
U.S. Appl. No. 12/201,426 of Nakata filed Aug. 29, 2008.
U.S. Appl. No. 12/210,409 of Nakata filed Sep. 15, 2008.
U.S. Appl. No. 12/210,440 of Nakata filed Sep. 15, 2008.
U.S. Appl. No. 12/233,800 of Nakata filed Sep. 19, 2008.
U.S. Appl. No. 12/235,917 of Nakata filed Sep. 23, 2008.
U.S. Appl. No. 12/255,936 of Ishizuka filed Oct. 22, 2008.
U.S. Appl. No. 12/256,100 of Ishizuka filed Oct. 22, 2008.
U.S. Appl. No. 12/258,726 of Ishizuka filed Oct. 27, 2008.
U.S. Appl. No. 12/258,750 of Ishizuka filed Oct. 27, 2008.
Japanese Office Action dated Aug. 25, 2009, issued in corresponding Japanese Application No. 2007-258512, with English translation.

* cited by examiner

DEFECTIVE INJECTION DETECTION DEVICE AND FUEL INJECTION SYSTEM HAVING THE SAME

CROSS REFERENCE TO RELATED APPLICATIONS

This application is based on and incorporates herein by reference Japanese Patent Application No. 2007-258512 filed on Oct. 2, 2007.

FIELD OF THE INVENTION

The present invention relates to a defective injection detection device for detecting a defective fuel injection of a fuel injection valve. The present invention further relates to a fuel injection system having the defective injection detection device.

BACKGROUND OF THE INVENTION

In a fuel injection system, fuel is accumulated in a common rail as a pressure-accumulation vessel, and a fuel injection valve injects the fuel in accordance with an injection instruction signal. In such a fuel injection system, fuel may be injected in a different mode from an injection instruction due to fuel leak or the like. For example, JP-A-5-52146 discloses a device for detecting such a defective injection state. In the fuel injection system according to JP-A-5-52146, the common rail is provided with a rail pressure sensor for detecting pressure of pressure-accumulated fuel. In the present system, an operation of a fuel pump for feeding fuel to the common rail is feedback-controlled such that the detected pressure of the rail pressure sensor coincides with a target value. The target value is determined on the basis of rotation speed of the engine and engine load. The defective injection detection device according to JP-A-5-52146 determines whether the target value is less than a reference value due to fuel leak or the like. The defective injection detection device detects a defective injection state when determining the target value to be less than the reference value, i.e., the injection quantity to be less than demanded quantity.

However, the defective injection detection device according to JP-A-5-52146 detects the defective injection when determining a failure to be caused in the target value, which is used in the feedback control. Accordingly, the present defective injection detection device indirectly detects the actual injection state. Therefore, a time lag between a time point, at which the fuel injection quantity actually begins to decrease due to fuel leak or the like, and a time point at which a failure occurs in the target value, is large. Therefore, quick detection of the defective injection is difficult, and accuracy of the detection of the defective injection is also low.

SUMMARY OF THE INVENTION

In view of the foregoing and other problems, it is an object of the present invention to produce a defective injection detection device configured to quickly and accurately detect a defective fuel injection. It is another object to produce a fuel injection system having the defective injection detection device.

According to one aspect of the present invention, a defective injection detection device for a fuel injection system configured to inject fuel, which is accumulated in a pressure-accumulation vessel, from a fuel injection valve, the defective injection detection device comprises a pressure sensor located in a fuel passage, which extends from the pressure-accumulation vessel to a nozzle hole of the fuel injection valve, and configured to detect pressure, which is fluctuated by injection of fuel through the nozzle hole, the pressure sensor being located closer to a nozzle hole than the pressure-accumulation vessel. The defective injection detection device comprises instruction signal output means for outputting an injection instruction signal so as to instruct an injection mode of fuel to the fuel injection valve. The defective injection detection device comprises defective injection determination means for determining whether a detected pressure of the fuel pressure sensor is fluctuated in a fluctuation mode in a range assumed from the injection instruction signal. The defective injection determination means is configured to determine that a defective injection occurs when determining that the detected pressure is out of the fluctuation mode in the assumed range.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

An embodiment embodying a fuel injection device and a fuel injection system will be described below with reference to drawings. A fuel injection device according to the present embodiment is mounted to, for example, a common-rail fuel injection system for an internal combustion engine for an automobile. For example, the present fuel injection device is used for directly injecting high-pressure fuel to a combustion chamber in a cylinder of a diesel engine. The high-pressure fuel is, for example, light oil, which is at injection pressure more than 100 MPa.

First, the common-rail fuel injection system as an in-vehicle engine system according to the present embodiment is described with reference to FIG. 1. In the present embodiment, for example, a multi-cylinder four-stroke reciprocal diesel engine such as an inline 4-cylinder engine is employed. In the present engine, an electromagnetic pickup as a cylinder-detection sensor is provided to a camshaft of an intake valve and an exhaust valve so as to successively determine an object cylinder at that time. Each of four cylinders #1 to #4 repeats four-stroke combustion cycles, each including an intake stroke, a compression stroke, a combustion stroke, and an exhaust stroke, at 720 degree CA (crank angle). In detail, the #1, #3, #4, #2 cylinders perform the four-stroke combustion cycle in this order at 180-degree-CA shift relative to each other.

Figure 1:
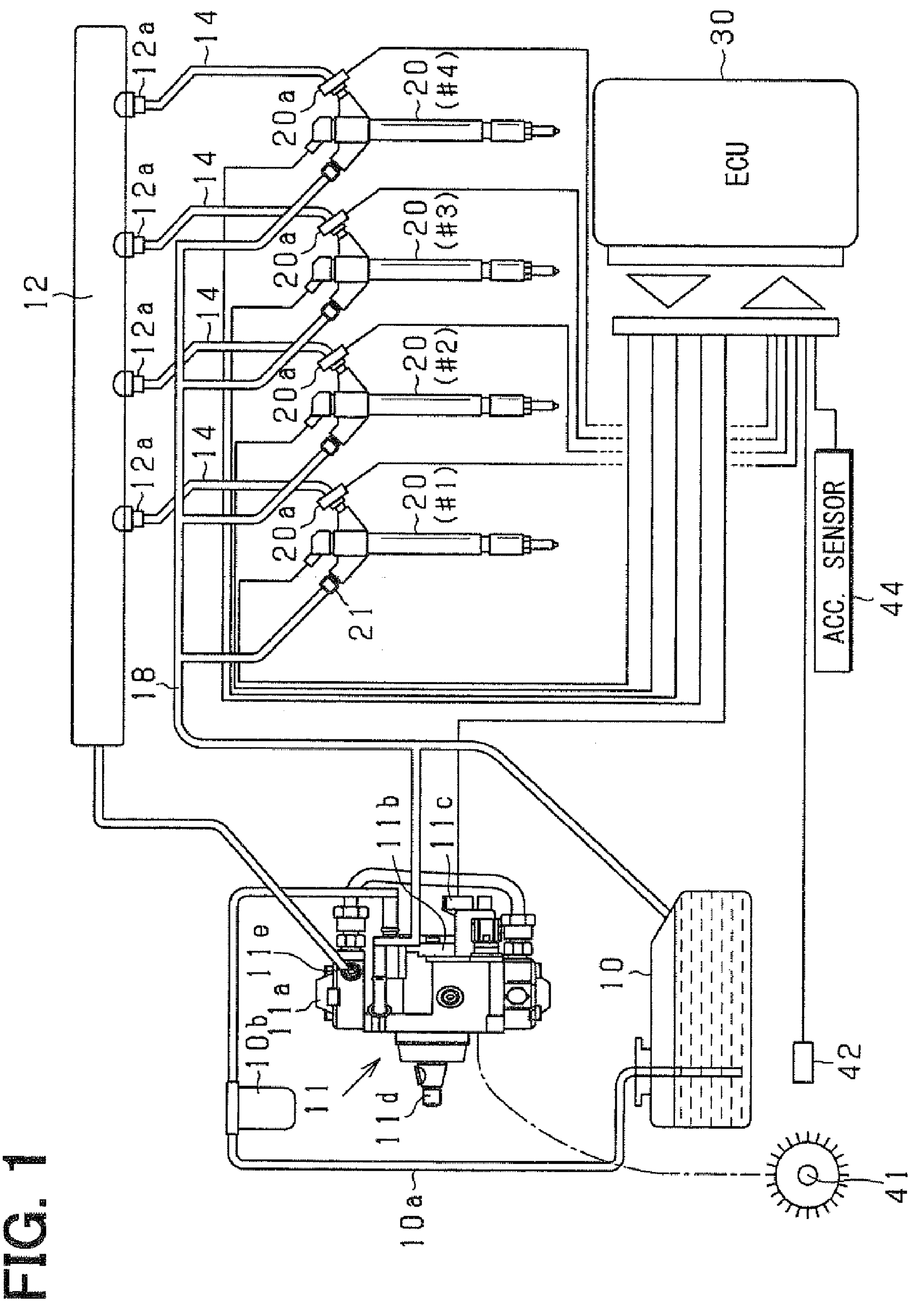
FIG. 1 is a schematic diagram showing an outline of an engine control system provided with a defective injection detection device according to an embodiment.

As shown in FIG. 1, the present fuel injection system includes an electronic control unit (ECU) 30, which is configured to input detection signals, which are outputted from various sensors, and control components of a fuel supply system in accordance with the detection signals. The ECU 30 operates as a fuel injection control unit. The ECU 30 controls an electric current, which is supplied to a suction control valve 11*c*, thereby controlling an amount of fuel discharged from a fuel pump 11. The ECU 30 performs a feedback control such as a PID control to regulate fuel pressure in a common rail 12 as a pressure-accumulation vessel at target fuel pressure. The pressure in the common rail 12 is detected using a fuel pressure sensor 20*a*. The ECU 30 controls an amount of fuel injected into a specific cylinder of the engine based on the fuel pressure, thereby controlling rotation speed and torque of an output shaft of the engine.

A fuel tank 10, the fuel pump 1, the common rail 12, and the injectors (fuel injection valve) 20 are arranged in this order from the upstream in the fuel supply system. The fuel tank 10 is connected with the fuel pump 11 through a fuel filter 10*b* and a pipe 10*a*.

The fuel pump 11 includes a high-pressure pump 11*a* and a low-pressure pump 11*b*. The high-pressure pump 11*a* is driven by a drive shaft 11*d*. The low-pressure pump 11*b* is configured to pump fuel from the fuel tank 10, and the high-pressure pump 11*a* is configured to further pressurize the fuel pumped from the low-pressure pump 11*b*. A suction control valve (SCV) 11*c* is provided in an inlet of the fuel pump 11 to control an amount of fuel fed to the high-pressure pump 11*a*. In the present structure, the suction control valve 11*c* controls an amount of fuel discharged from the fuel pump 11.

The suction control valve 11*c* is, for example, a normally-on regulating valve, which opens when being de-energized. In the present structure, an amount of fuel discharged from the fuel pump 11 can be regulated by controlling a drive current supplied to the suction control valve 11*c* so as to manipulate a valve-opening area of the suction control valve 11*c*.

The fuel pump 11 pumps fuel from the fuel tank 10 through the fuel filter 10*b* and press-feeds the pumped fuel to the common rail 12. The common rail 12 stores the fuel, which is fed from the fuel pump 11, at high pressure. The common rail 12 distributes the accumulated fuel to the injector 20 of each of the cylinders #1 to #4 through a high-pressure pipe 14, which is provided to each cylinder. Each of the injectors 20(#1) to 20(#4) has an exhaust port 21, which is connected with a pipe 18 for returning excessive fuel to the fuel tank 10. An orifice 12*a* as a pulsation reducing unit is provided to a connection between the common rail 12 and the high-pressure pipe 14 for attenuating pulsation in pressure of fuel, which flows from the common rail 12 into the high-pressure pipe 14.

Figure 2:
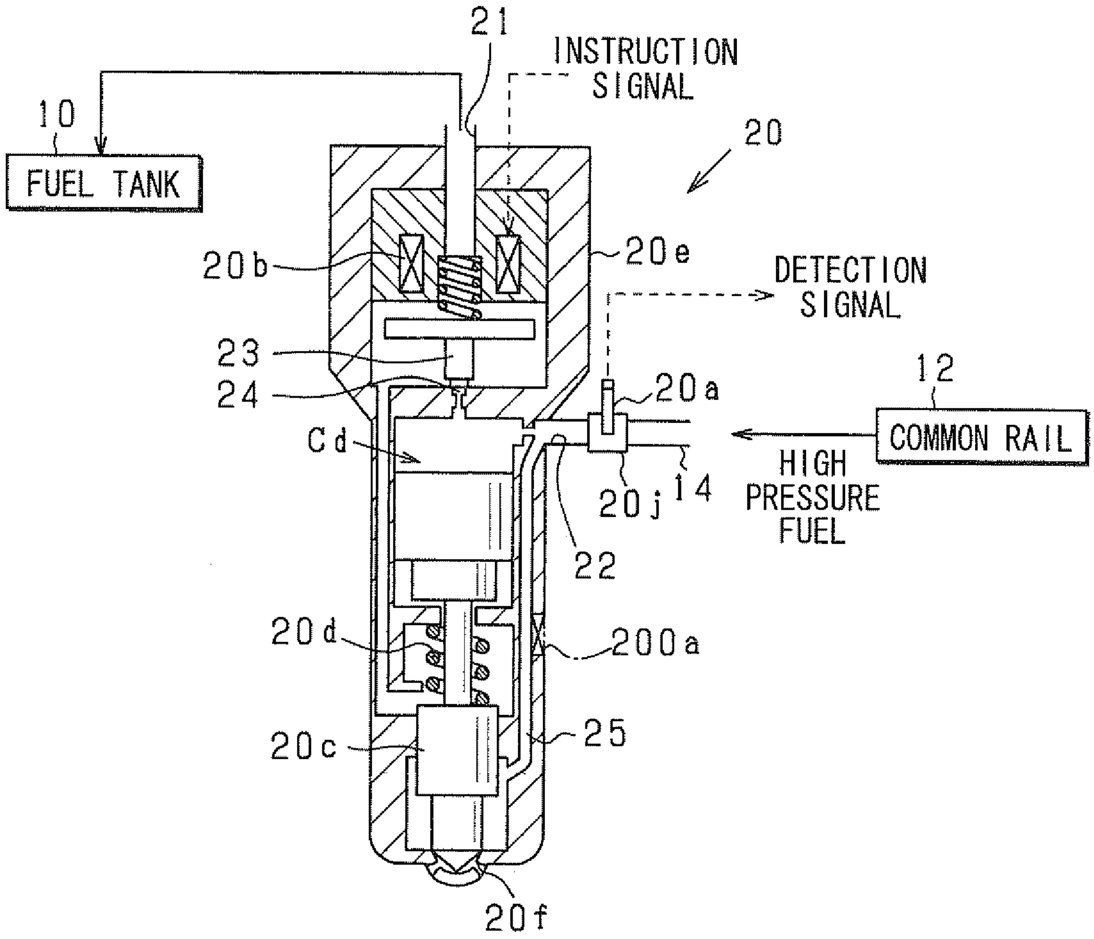
FIG. 2 is a schematic sectional view showing an internal structure of a fuel injection valve employed in the engine control system.

FIG. 2 shows a detailed structure of the injector 20. The four injectors 20(#1) to 20(#4) substantially has the same structure, which is, for example, the structure shown in FIG. 2. Each injector 20 is a fuel injection valve, which is hydraulically actuated using fuel, the fuel being drawn from the fuel tank 10 and to be burned in the engine. In the injector 20, driving power for fuel injection is transmitted via a hydraulic pressure chamber Cd as a control chamber. As shown in the FIG. 2, the injector 20 is configured as the normally-close fuel injection valve, which is in a closed state when being de-energized.

High-pressure fuel is supplied from the common rail 12, and the High-pressure fuel flows into a fuel inlet hole 22, which is provided in a housing 20*e* of the injector 20. The supplied high-pressure fuel partially flows into the hydraulic pressure chamber Cd, and remaining high-pressure fuel flows to nozzle holes 20*f*. The hydraulic pressure chamber Cd has a leak hole 24, which is opened and closed by a control valve 23. When the leak hole 24 is opened by lifting the control valve 23, fuel is returned from the hydraulic pressure chamber Cd to the fuel tank 10 through the leak hole 24 and the exhaust port 21.

In the fuel injection of the injector 20, the control valve 23 is operated according to the energization and de-energization of a solenoid 20*b*, which is a two-way solenoid valve, whereby the control valve 23 controls leakage of fuel from the hydraulic pressure chamber Cd. Thus, the control valve 23 controls pressure in the hydraulic pressure chamber Cd. Here, the pressure in the hydraulic pressure chamber Cd is equivalent to backpressure applied to a needle valve 20*c*. Thus, the needle valve 20*c* reciprocates upward and downward inside the housing 20*e* according to the change in pressure in the hydraulic pressure chamber Cd, while being applied with biasing force of a coil spring 20*d*. In the present operation, a fuel passage 25, which extends to the nozzle holes 20*f*, is opened and closed midway therethrough. Specifically, the fuel passage 25 has a tapered seat surface, and the needle valve 20*c* is seated to and lifted from the tapered seat surface in accordance with the reciprocation of the needle valve 20*c*, whereby the needle valve 20*c* communicates and blockades the fuel passage 25. The number of the nozzle holes 20*f* may be arbitrary determined.

The needle valve 20*c* is, for example, on-off controlled. Specifically, the needle valve 20*c* has the two-way solenoid valve as the actuator, which is applied with a pulse signal as an energization signal. The pulse signal as an ON-OFF signal is transmitted from the ECU 30 to energize and de-energize the solenoid valve. The needle valve 20*c* is lifted by turning on the pulse signal, thereby opening the nozzle holes 20*f*. The needle valve 20*c* is seated by turning off the pulse signal, thereby blockading the nozzle holes 20*f*.

The pressure in the hydraulic pressure chamber Cd is increased by supplying fuel from the common rail 12. On the other hand, the pressure in the hydraulic pressure chamber Cd is decreased by energizing the solenoid 20*b* to manipulate the control valve 23 so as to open the leak hole 24. In the present structure, fuel is returned from the hydraulic pressure chamber Cd to the fuel tank 10 through the pipe 18 (FIG. 1), which connects the injector 20 with the fuel tank 10. That is, the fuel pressure in the hydraulic pressure chamber Cd is controlled by manipulating the control valve 23, so that the needle valve 20*c* is operated for opening and closing the nozzle holes 20*f*.

In the present structure, the injector 20 includes the needle valve 20*c*, which is configured to open and close the injector 20 by opening and closing the fuel passage 25, which extends to the nozzle holes 20*f*, in conjunction with the predetermined axial reciprocation inside the housing 20*e* as the valve body. When the solenoid is de-energized, the needle valve 20*c* is displaced to a close side by being applied with the biasing force of the spring 20*d*, which is regularly exerted toward the close side. When the solenoid is energized, the needle valve 20*c* is displaced to an open side by being applied with the driving force against the biasing force of the spring 20*d*. The lift of the needle valve 20*c* when being energized is substantially symmetric with the lift of the needle valve 20*c* when being de-energized.

The injector 20 is provided with the fuel pressure sensor 20*a* (FIG. 1) for detecting fuel pressure. Specifically, the fuel inlet hole 22 of the housing 20*e* is connected with the high-pressure pipe 14 via a jig 20*j*. The fuel pressure sensor 20*a* is attached to the jig 20*j*. Thus, the fuel pressure as inlet pressure in the fuel inlet hole 22 can be arbitrary detected by the fuel pressure sensor 20*a*, which is mounted to the fuel inlet hole 22 of the injector 20. Specifically, a fluctuation pattern of the fuel pressure attributed to fuel injection of the injector 20, a fuel pressure level (stable pressure), fuel injection pressure, and the like can be detected in accordance with the output of the fuel pressure sensor 20*a*.

The fuel pressure sensor 20*a* is provided to each of the injectors 20(#1) to 20(#4). In the present structure, the fluctuation pattern of the fuel pressure attributed to specific fuel injection of the injector 20 can be accurately detected based on the output of the fuel pressure sensor 20*a*.

In addition, various kinds of sensors for a vehicle control other than the above-mentioned sensors are provided in a vehicle such as a four-wheel automobile or a track (not shown). For example, a crank angle sensor 42 such as an electromagnetic pick up is provided to the outer periphery of a crankshaft 41, which is an output shaft of the engine. The crank angle sensor 42 is configured to detect the rotation angle and the rotation speed of the crankshaft 41, which corresponds to the engine rotation speed. The crank angle sensor 42 is configured to output a crank angle signal at predetermined intervals such 30 degree-CA. Arm accelerator sensor 44 is provided to detect a manipulation, which corresponds to depression of an accelerator by a driver. The accelerator sensor 44 is configured to output an electric signal according to a state, which corresponds to the position of the accelerator.

The ECU 30 predominantly performs an engine control as a fuel injection control unit in the present system. The ECU 30 as an engine control ECU includes a generally-known microcomputer (not shown). The ECU 30 determines an operating state of the engine and an occupant's demand on the basis of the detection signals of the various sensors, thereby operating various actuators such as the suction control valve 11*c* and the injector 20 in response to the operating state and the occupant's demand. Thus, the ECU 30 performs various controls relating to the engine in optimal modes adaptively to the various conditions.

The microcomputer of the ECU 30 includes a CPU as a main processing unit, which performs various kinds of operations, a RAM as a main memory, which stores temporarily data, an operation result, and the like, a ROM as a program memory, an EEPROM as a data storage, a backup RAM, and the like. The backup RAM is a memory, which is regularly supplied with electric power from a backup power supply such as an in-vehicle battery even when the main power supply of the ECU 30 is terminated. Various programs and control data maps relating to the fuel injection are stored in advance in the ROM and various control data including the design data of the engine are stored in the data storage memory such as the EEPROM.

In the present embodiment, the ECU 30 calculates demand torque, which is required to the crankshaft 41 as the output shaft, and fuel injection quantity for satisfying the demand torque, based on various kinds of sensor outputs as the detection signals, which are arbitrary inputted. In the present structure, the ECU 30 variably sets the fuel injection quantity of the injector 20, thereby controlling engine torque, which is generated through fuel combustion in the combustion chamber of each cylinder. Thus, the ECU 30 controls axial torque as output torque, which is actually outputted to the crankshaft 41, at the demand torque.

That is, the ECU 30 calculates, for example, the fuel injection quantity according to the engine operation state and manipulation of the accelerator by the driver, and the like at the time. The ECU 30 outputs the injection control signal (drive quantity) to the injector 20 so as to direct to inject fuel correspondingly to the fuel injection quantity at a predetermined injection timing. In the present operation, the output torque of the engine is controlled at a target value based on the drive quantity, which is, for example, an opening period of the injector 20.

As generally known, in a diesel engine, an intake throttle valve (throttle valve), which is provided in an intake passage of the engine, is held at a substantially full open state in a steady operation so as to further draw fresh air and to reduce pumping loss. Therefore, the fuel injection quantity is mainly manipulated for controlling a combustion state at the time of the steady operation. In particular, a combustion control related to a torque adjustment is mainly performed at the time of the steady operation.

Figure 3:
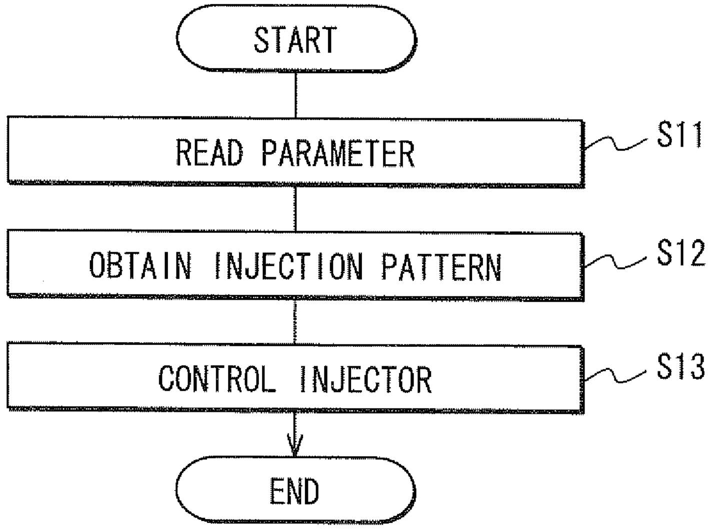
FIG. 3 is a flow chart showing an injection control according to the embodiment.
Figure 5:
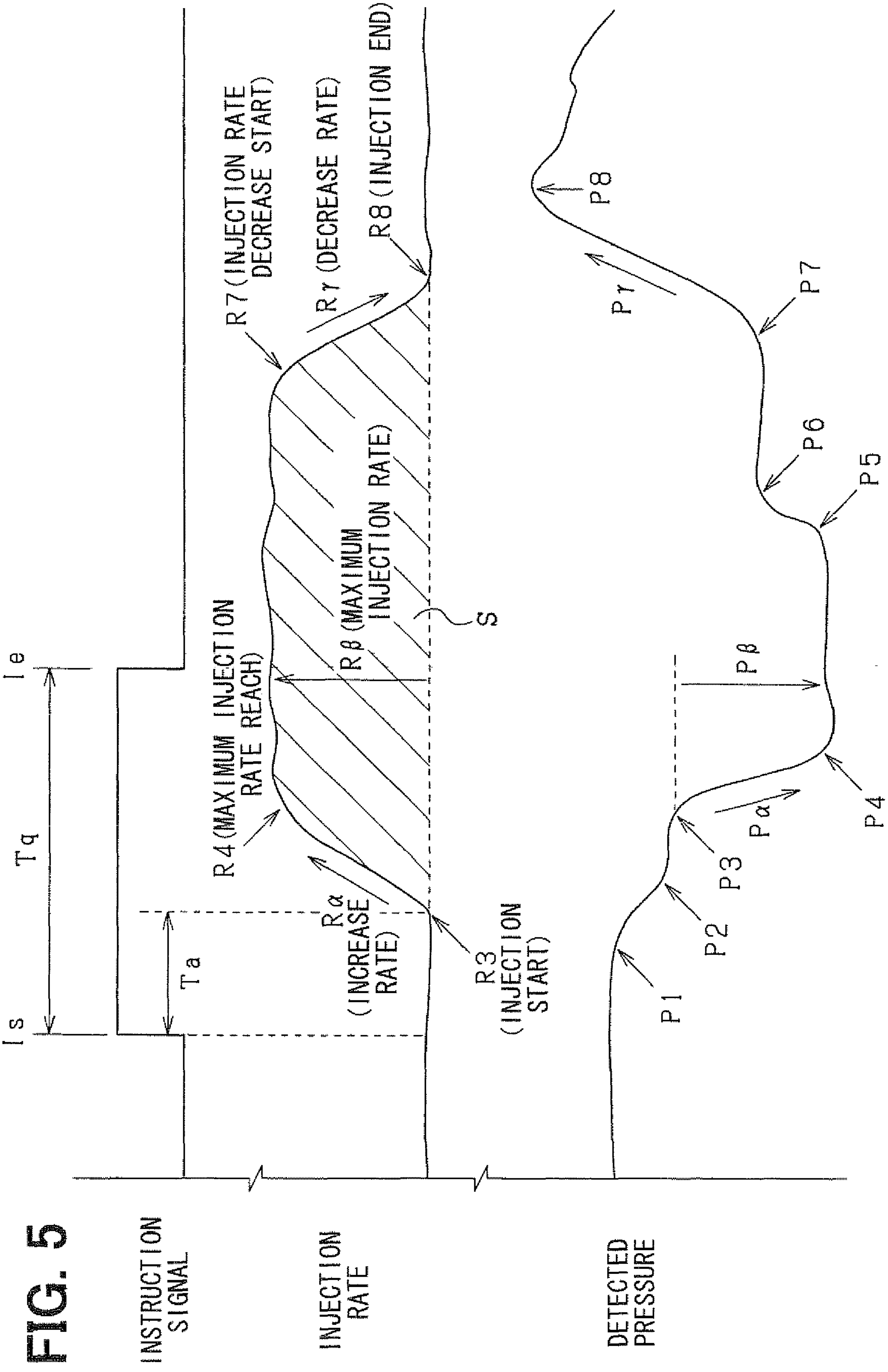
FIG. 5 is a time chart showing a relationship between a transition waveform of a detected pressure of a fuel pressure sensor and fluctuation of the injection rate, according to the embodiment.
Figure 6:
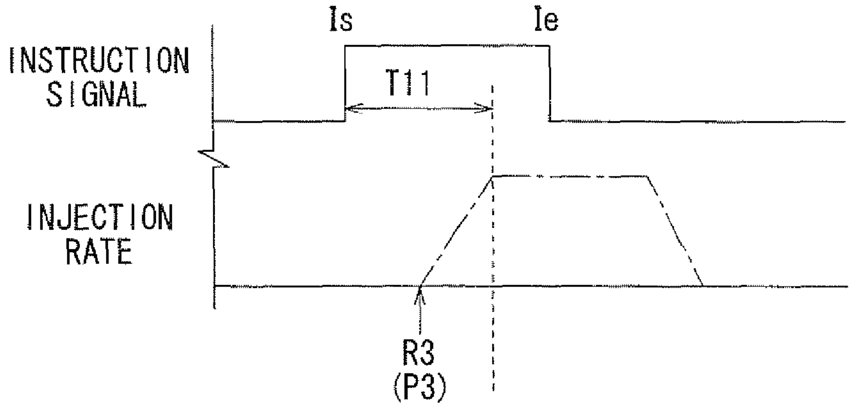
FIGS. 6 to 12 are views each showing an aspect of the injection rate when a defective injection occurs or when the fuel injection is in a normal mode.

As follows, the fuel injection control according to the present embodiment is described with reference to FIG. 3. In this regard, the values of various parameters used in the processing shown in FIG. 3 are sequentially stored in the storage device, and are sequentially updated as needed. The storage device may be the RAM and the EEPROM mounted in the ECU 30, or the backup RAM. The series of processings shown in FIG. 2, FIG. 5, and FIG. 6 are performed by the ECU 30 on the basis of the program stored in the ROM, in general.

In the series of the present processing shown in FIG. 3, at step S11, predetermined parameters are read. The predetermined parameters may include the engine speed, the fuel pressure, an accelerator manipulation of the driver, and the like at that time. The engine speed may be obtained based on an actual measurement of the crank angle sensor 42. The fuel pressure may be obtained based on an actual measurement of The fuel pressure sensor 20*a*. The accelerator manipulation may be obtained from an actual measurement of the accelerator sensor 44.

At subsequent step S12, an injection pattern is set up based on the various parameters, which are read at step S11. The injection patterns are variably determined according to the demand torque of the crankshaft 41, which is equivalent to the engine load at that time. For example, in a single-stage injection, the injection quantity Q (injection period) of the single-stage injection is variably determined as the injection pattern. Alternatively, in a multi-stage injection, the total injection quantity Q (the total injection period) of injections, which contribute to the engine torque, is variably determined as the injection pattern. The demand torque may be calculated in accordance with the manipulation of the accelerator pedal or the like.

The present injection pattern is obtained based on a predetermined data map such as a data map for the injection control and a correction coefficient stored in the ROM, for example. The predetermined data map may be substituted to an equation. Specifically, for example, an optimal injection pattern (conformed value) may be beforehand obtained in an assumed range of the predetermined parameter (step S11) by conducting an experiment. The obtained optimal injection pattern may be stored in the data map for the injection control.

The present injection pattern is defined by parameters, such as an injection stage, the injection timing of each injection, and the injection period, for example. The injection stage is a number of injections in one burning cycle. The injection period is equivalent to the injection quantity. In this way, the injection control map indicates the relationship between the parameters and the optimal injection pattern.

The injection pattern is obtained from the injection control map and is corrected using a correction coefficient. For example, the target value is calculated by dividing the value on the injection control map by the correction coefficient. Thus, the injection pattern at the time and an instruction signal, which corresponds to the injection pattern and is to be outputted to the injector 20, is obtained. The correction coefficient is stored in, for example, the EEPROM of the ECU 30 and separately updated. The correction coefficient (strictly, predetermined coefficient multiple coefficients) is successively updated by a separate processing in an operation of the engine.

In the setting of the injection pattern at step S12, data maps may be respectively created separately for the injection patterns, each including identical elements such as the injection stage. Alternatively, a data map may be created for the injection pattern, which includes some of or all the elements.

The injection pattern, which is set in this way, and the command value as the instruction signal, which corresponds to the injection pattern, are used at subsequent step S13. Specifically, at step S13 (instruction signal output means), the injector 20 is controlled based on the command value as the instruction signal. In particular, the injector 20 is controlled according to the instruction signal outputted to the injector 20. The series of processings in FIG. 3 is terminated after performing the control of the present injector 20.

Figure 4:
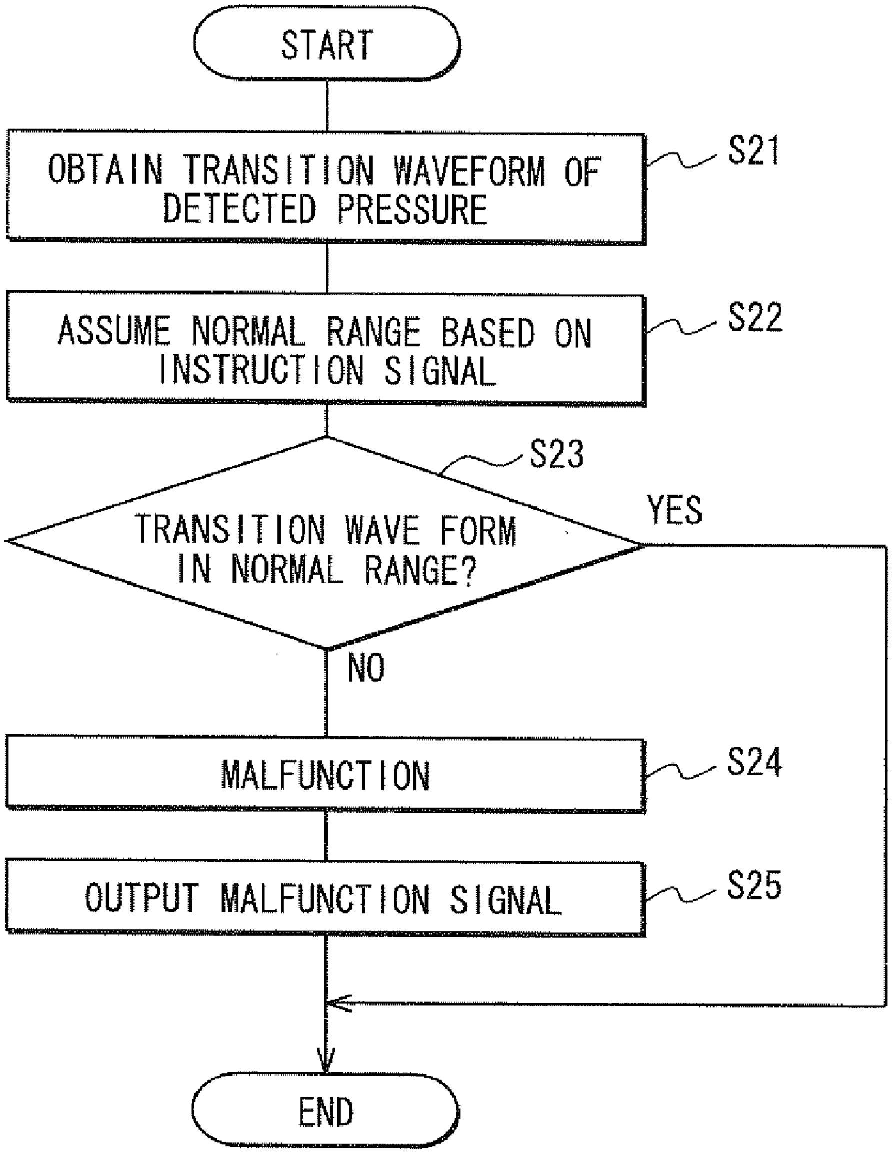
FIG. 4 is a flow chart showing a defective injection detection processing according to the embodiment.

Next, a defective injection detection processing is described with reference to FIG. 4. The defective injection detection processing is conducted to detect clogging of the nozzle holes 20*f* of the injector 20 and defective injection caused by non-smooth sliding of the needle valve 20*c*. The series of processings in FIG. 4 is executed at a predetermined cycle (for example, an arithmetic operation cycle of the CPU) or a predetermined crank angle. The ECU 30, which performs the present processing, is equivalent to a defective injection detection device.

At step S21, the output value (detected pressure) of the fuel pressure sensor 20*a* is first inputted. The present input processing is performed for each of the multiple fuel pressure sensors 20*a*. In the subsequent steps S22 to S25, the defective injection detection processing is performed for each of the multiple injectors 20.

Here, the input processing of step S21 is described in detail with reference to FIG. 5. FIG. 5 indicates the injection instruction signal outputted to the injector 20 at step S13 in FIG. 3. The solenoid 20*b* is operated by setting on the instruction signal as a pulse signal, thereby opening the nozzle holes 20*f*. An injection start is instructed at a pulse-on time point Is of the injection instruction signal. An injection end is instructed at a pulse-off time point Ie of the injection instruction signal. Thus, the injection quantity Q is controlled by setting on the instruction signal to instruct the fuel injection and manipulating an opening period Tq of the nozzle holes 20*f*. FIG. 5 further indicates change in rate (injection rate) of the fuel injection from the nozzle holes 20*f* attributed to the injection instruction and change in output value (detected pressure) of the fuel pressure sensor 20*a*, the output value being attributed to the change in injection rate.

The ECU 30 detects the output value of the fuel pressure sensor 20*a* by executing a sub-routine other than the processing in FIG. 4. In the present subroutine, the output value of the fuel pressure sensor 20*a* is successively obtained at an interval, which is shorter than the predetermined cycle in FIG. 4. The present interval of the obtaining the output value of the fuel pressure sensor 20*a* is short sufficient to draw the locus of a pressure transition waveform of the sensor output, as shown in FIG. 5. Specifically, the sensor output is successively obtained at an interval shorter than 50 microseconds, and the present interval is preferably 20 microseconds.

The change in injection rate shown in FIG. 5 is estimated from the fluctuation (pressure transition waveform) in inlet pressure shown in FIG. 5. The estimated change in injection rate is used for updating (learning) of the injection control map described at step S11 in FIG. 3, and the like. The fluctuation in detected pressure and the change in injection rate of the fuel pressure sensor 20*a* have correlation describes below, and hence the change in injection rate can be estimate as described above.

First, as shown in FIG. 5, the injection start instruction Is is outputted, thereafter the injection rate starts increasing at the time point R3 after a response delay Ta, and thus fuel injection is started. On the other hand, the detected pressure decreases at the transition point P1 in advance of the injection start time R3. It is caused because the control valve 23 opens the leak hole 24 at the time point P1, whereby the hydraulic pressure chamber Cd is decompressed. Then, when the hydraulic pressure chamber Cd is sufficiently decompressed, the detected pressure, which is decreasing from the P1, once stops decreasing at the transition point P2. Subsequently, the detected pressure starts decreasing at the transition point P3, since the injection rate starts increasing at the time point R3. Subsequently, the decrease in the detected pressure stops at the transition point P4, since the injection rate reaches the maximum injection rate at the time point R4.

Subsequently, the detected pressure increases at the transition point P5. It is caused because the control valve 23 closes the leak hole 24 at the time of P5, whereby the hydraulic pressure chamber Cd is pressurized. Then, when the hydraulic pressure chamber Cd is sufficiently pressurized, the detected pressure, which is increasing from the transition point P5, once stops increasing at the transition point P6. Subsequently, the detected pressure starts increasing at the transition point P7, since the injection rate starts decreasing at the time point R7. Subsequently, the increase in detected pressure stops at the transition point P8, since the injection rate reaches zero at the time point R8, and actual fuel injection stops at the time point R8. The detected pressure subsequent to the time point P8 is not shown. Actually, subsequent to the time point P8, the detected pressure decreases while repeating increasing and decreasing at a constant interval, and then the detected pressure becomes substantially constant.

As described above, an increase start time point R3 (injection start time point) of the injection rate and a decrease end time point R8 (injection end time point) of the injection rate can be estimated by detecting the transition points P3 and P8 in the fluctuation in detected pressure of the fuel pressure sensor 20*a*. Further, the change in injection rate can be estimated from the fluctuation in detected pressure by using a correlation between the fluctuation in detected pressure and the change in injection rate (described below).

A pressure decrease rate Pα between the transition points P3, P4 of the detected pressure and an injection rate increase rate Rα between the transition points R3, R4 of the injection rate therebetween have a correlation. A pressure increase rate Pγ between the transition points P7, P8 and the injection rate decrease rates Rγ between the transition points R7, RB therebetween have a correlation. A pressure decrease Pβ between the transition points P3, P4 and an injection rate increase Rβ between the transition points R3, R4 therebetween have a correlation. Therefore, the injection rate increase rate Rα, the injection rate decrease rate Rγ, and the injection rate increase Rβ can be estimated by detecting the pressure decrease rate Pα, the pressure increase rate Pγ, and the pressure decrease Pβ from the fluctuation in detected pressure of the fuel pressure sensor 20*a*. Thus, the various states R3, R8, Rα, Rβ, Rγ of the injection rate can be estimated, and hence the change in fuel injection rate indicated in FIG. 6 can be estimated.

An integral value of the injection rate between the actual injection start and the actual injection end is equivalent to the injection quantity. The integral value as the injection quantity is indicated by the hatched area S. A portion of the transition waveform of the detected pressure between the transition points P3 to P8 corresponds to the injection rate change between the actual injection start and the actual injection end. An integral value of the pressure of the portion between the transition points P3 to P8 and the integral value S of the injection rate therebetween have a correlation. Therefore, the injection rate integral value S, which corresponds to the injection quantity Q, can be estimated by calculating the pressure integral value from the fluctuation of the detected pressure of the fuel pressure sensor 20*a*.

Referring back to FIG. 4, at step S22 subsequent to step S21, when the injection is in a normal state, a mode of the change in detected pressure is estimated based on the injection start instruction time point Is and injection end instruction time point Ie attributed to the injection instruction signal. Thus, normal range with respect to the estimated fluctuation mode (transition waveform) is assumed. The present assumption is described later in detail. At subsequent step S23 (defective injection determination means), it is determined whether the actual transition waveform of the detected pressure obtained at step S21 is in the normal range assumed at step S22.

When it is determined that the actual transition waveform is not in the normal range, an abnormal determination processing is executed and it is determined that a defective injection (malfunction) occurs at step S24 (defective injection determination means). At subsequent step S25 (defect signal output means), a defect signal (malfunction signal) is outputted, and the occurrence of the defect is stored to the EEPROM or the like. The defect signal includes information possibility of a defective state (malfunction) described later in detail. A defect processing unit such as the microcomputer of the ECU 30 receives the defect signal, thereby notifying an occupant to exchange the injector 20 or prohibiting the output of the injection instruction signal to the corresponding injector 20 so as to steadily stop the fuel injection, for example.

Next, the normal range of the transition waveform assumed at step S22 is described. In the present embodiment, the normal range satisfies all of the following conditions (a) to (f). In the case where at least one of the conditions is not satisfied, it is determined that a defective injection occurs at step S23.

(a) As shown by the dashed dotted line in FIG. 6, in the case of the normal injection, the injection is started in a first predetermined period (first period) T11, which starts from the injection start instruction time point Is, and the injection rate starts increasing at the transition point R3. The detected pressure starts decreasing at the transition point P3, since the injection rate starts increasing at the time point R3. Therefore, when the transition point P3 of the pressure decrease start, which is attributed to the injection instruction signal, appears in the first predetermined period T11, which starts from the injection start instruction time point Is, the transition waveform is determined to be in the normal range.

The first predetermined period T11 is preferably set variably according to the detected pressure before the transition point P1 appears. For example, when the detected pressure is high at the injection start instruction time point Is, the transition point P1 tends to appear at an early stage in the normal injection. Therefore, the first predetermined period T11 is preferably set to be short.

As indicated by the solid line in FIG. 6, when the detected pressure transition point P3, which relates to the injection rate transition point R3, does not appear in the first predetermined period T11 subsequent to the injection start instruction time point Is, it is determined that a defective injection occurs at step S23. Thus, defective information is included in the defect signal outputted at step S25. The present defective information indicates a possibility of a defective state where fuel injection is not performed in contradiction to the injection start instruction.

Figure 7:
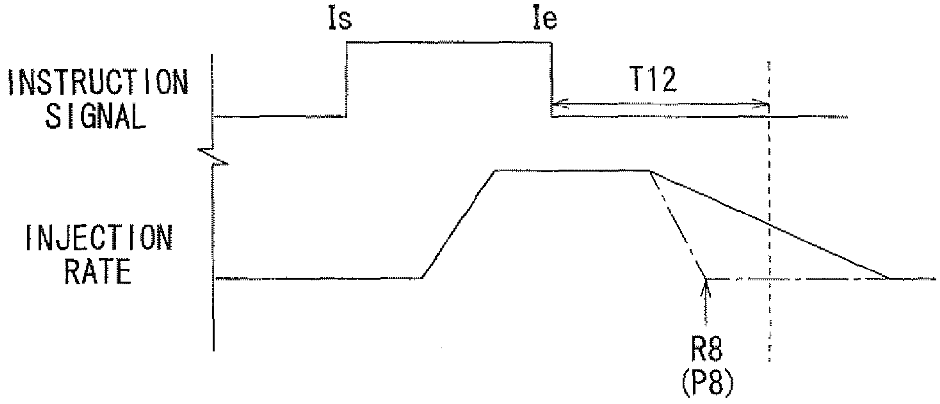

(b) As shown by the dashed dotted line in FIG. 7, in the case of the normal injection, the fuel injection is to be completed in the second predetermined period T12, which starts from the injection end instruction time point Ie. In this case, the injection rate, which continues decreasing from the transition point R7, stops the decreasing at the transition point R8. The detected pressure stops increasing at the transition point P8, since the injection rate stops decreasing at the time point R8. Therefore, when the transition point P8 of the pressure increase end, which is attributed to the injection instruction signal, appears in the second predetermined period T12, which starts from the injection end instruction time point Ie, the transition waveform is determined to be in the normal range.

The second predetermined period T12 is preferably set variably in accordance with at least one of the detected pressure before the transition point P1 and an open instruction time Tq attributed to the injection instruction signal. For example, as the detected pressure becomes high at the injection start instruction time point Is, or as the open instruction time Tq becomes long, the transition point P8 tends to appear at an early stage in the normal injection. Therefore, in this case, the second predetermined period T12 is preferably set to be short.

As indicated by the solid line in FIG. 7, when the detected pressure transition point P8, which relates to the injection rate transition point R8, does not appear in the second predetermined period T12 subsequent to the injection end instruction time point Ie, it is determined that a defective injection occurs at step S23. Thus, defective information is included in the defect signal outputted at step S25. The present defective information indicates a possibility of a defective state where the fuel injection may be continued in contradiction to the injection end instruction.

Figure 8:
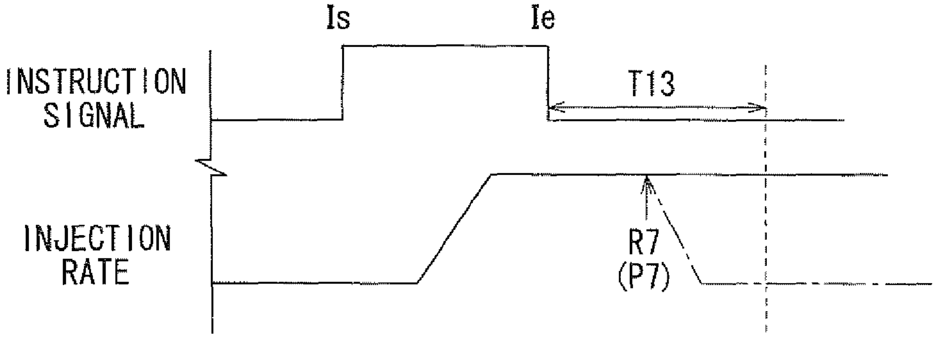

(c) As shown by the dashed dotted line in FIG. 8, in the case of the normal injection, the injection rate starts decreasing at the transition point P7 in the third predetermined period T13, which starts from the injection end instruction time point Ie, and the detected pressure starts increasing at the transition point P7, since the injection rate starts decreasing. Therefore, when the transition point P7 of the pressure increase start, which is attributed to the injection instruction signal, appears in the third predetermined period T13, which starts from the injection end instruction time point Ie, the transition waveform is determined to be in the normal range.

The third predetermined period T13 is preferably set variably in accordance with at least one of the detected pressure before the transition point P1 and the open instruction time Tq attributed to the injection instruction signal. For example, as the detected pressure becomes high at the injection start instruction time point Is, or as the open instruction time Tq becomes long, the transition point P7 tends to appear at an early stage in the normal injection. Therefore, in this case, the third predetermined period T13 is preferably set to be short.

As indicated by the solid line in FIG. 8, when the detected pressure transition point P7, which relates to the injection rate transition point R7, does not appear in the third predetermined period T13 subsequent to the injection end instruction time point Ie, it is determined that a defective injection occurs at step S23. Thus, defective information is included in the defect signal outputted at step S25. The present defective information indicates a possibility of a defective state where the fuel injection may not start decreasing in contradiction to the injection end instruction.

Figure 9:
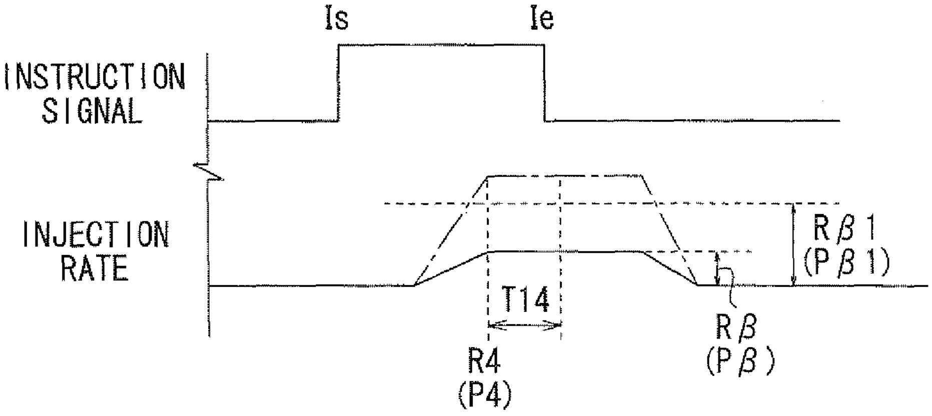

(d) As shown by the dashed dotted line in FIG. 9, in the case of the normal injection, the maximum injection rate Rβ subsequent to the injection rate transition point R4 exceeds a predetermined threshold Rβ1. Therefore, when the pressure decrease Pβ between the transition points P3, P4 in the fourth predetermined period T14, which starts from the pressure change point P4, exceeds a threshold equivalent to the threshold Rβ1, the transition waveform is determined to be in the normal range.

The fourth predetermined period T14 is preferably set variably in accordance with at least one of the detected pressure before the transition point P1 and the open instruction time Tq attributed to the injection instruction signal. For example, the detected pressure at the injection start instruction time point Is becomes high, or at the open instruction time Tq becomes long, the maximum injection rate Rβ in the normal injection greatly appears at an early stage. Therefore, in this case, the fourth predetermined period T14 is preferably set to be short, and the threshold Rβ1 is preferably set to be large.

As shown by the solid line in FIG. 9, when the pressure decrease P1 is less than the threshold in the fourth predetermined period T14, which starts from the maximum injection rate reach time R4, it is determined that a defective injection occurs at step S23. Thus, defective information is included in the defect signal outputted at step S25. The present defective information indicates that the injection rate does not sufficiently increase to the instructed maximum injection rate.

Figure 10:
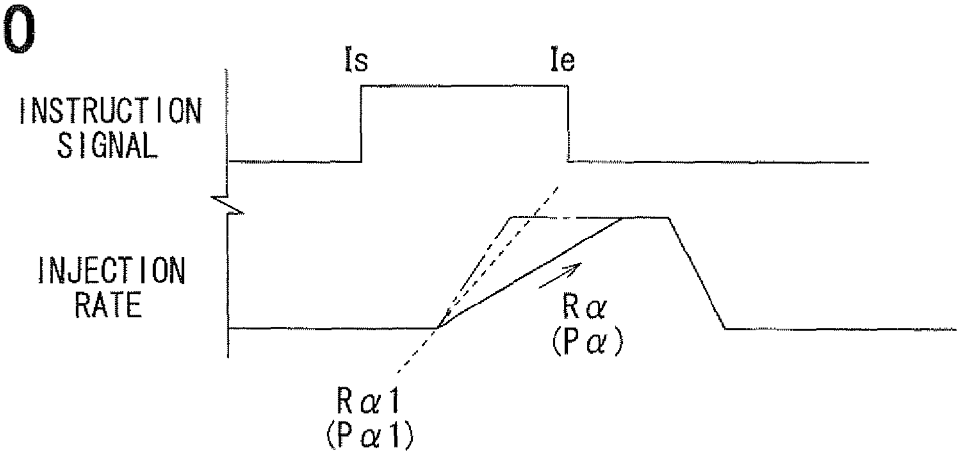

(e) As shown by the dashed dotted line in FIG. 10, in the case of the normal injection, the increase rate Rα of the injection rate becomes greater than the predetermined increase rate Rα1. Therefore, when the detected pressure quickly decreases, and the pressure decrease rate Pα becomes less than a predetermined pressure decrease rate Pα1, which corresponds to the predetermined increase rate Rα1, the transition waveform is determined to be in the normal range.

The predetermined pressure decrease rate Pα1 is preferably set variably in accordance with at least one of the detected pressure before the transition point P1 and the open instruction time Tq attributed to the injection instruction signal. For example, as the detected pressure becomes high at the injection start instruction time point Is, or as the open instruction time Tq becomes long, the increase rate Rα in the normal injection becomes large and quickly increases. Therefore, in this case, the predetermined increase rate Rα1 is preferably set to be large.

As shown by the solid line in FIG. 10, when the increase rate Rα of the injection rate is less than the predetermined increase rate Rα1, it is determined that a defective injection occurs at step S23. Thus, defective information is included in the defect signal outputted at step S25. The present defective information indicates that the increase rate of the actual injection rate is less than the instructed increase rate.

Figure 11:
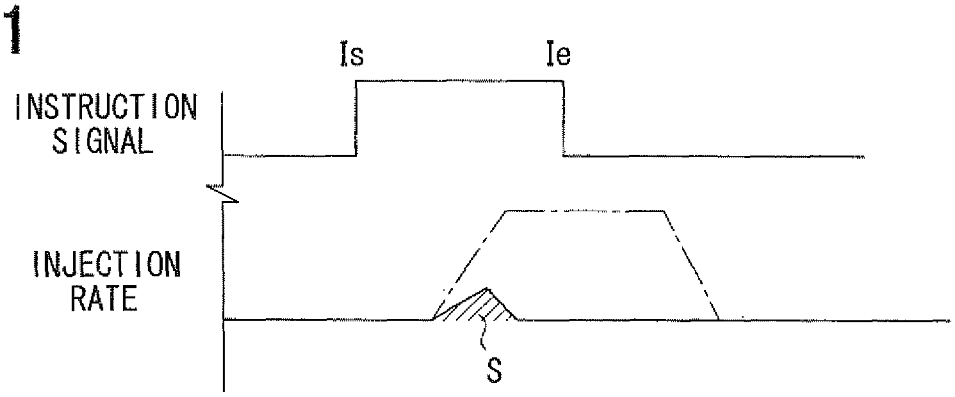
Figure 12:
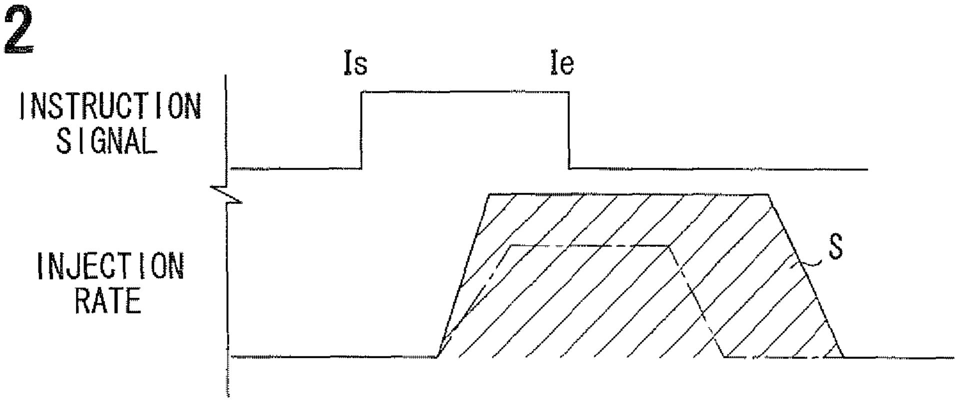

(f) As shown by the dashed dotted line in FIGS. 11, 12, in the case of the normal injection, the integral value S of the injection rate, which corresponds to the injection quantity Q, is greater than a predetermined lower limit and less than a predetermined upper limit. Therefore, when the integral value S is in the range greater than the predetermined lower limit and less than the predetermined upper limit, the transition waveform is determined to be in the normal range.

The predetermined lower and upper limits are preferably set variably in accordance with at least one of the detected pressure before the transition point P1 and the open instruction time Tq attributed to the injection instruction signal. For example, as the detected pressure becomes high at the injection start instruction time point Is, or as the open instruction time Tq becomes long, the injection quantity Q tends to become large. Therefore, in this case, the predetermined lower and upper limits are preferably set to be large values.

As shown by the solid lines in FIGS. 11, 12, when the integral value S is equal to or less than the predetermined lower limit or equal to or greater than the predetermined upper limit, it is determined that a defective injection occurs at step S23. Thus, defective information is included in the defect signal outputted at step S25. The present defective information indicates a possibility of a defective state where the actual injection quantity is insufficient or excessive compared with the instructed injection quantity.

In the abnormal determination based on the condition (a), the ECU 30 is equivalent to an injection start detection means, when performing the processing to detect the transition point P3 (injection start time point) of the pressure decrease start. In the abnormal determination based on the condition (b), the ECU 30 is equivalent to an injection end detection means when performing the processing to detect the transition point P8 (injection end time point) of the end of the pressure increase. In the abnormal determination based on the condition (c), the ECU 30 is equivalent to an injection-end-operation-start detection means when performing the processing to detect the transition point P7 (close operation start time point of the needle valve 20*c*) of the pressure increase start. In the abnormal determination based on the condition (d), the ECU 30 is equivalent to a maximum-injection-rate-reach detection means when performing the processing to detect the pressure decrease Pβ. In the abnormal determination based on the condition (e), the ECU 30 is equivalent to an injection-rate-increase detection means when performing the processing to detect the pressure decrease rate Pα. In the abnormal determination based on the condition (f), the ECU 30 is equivalent to an injection quantity calculating means when performing the processing to calculate the injection quantity Q.

In the present embodiment, the fuel pressure sensor 20*a* is provided to the injector 20. In the present structure, the fuel pressure sensor 20*a* is located closer to the nozzle holes 20*f* compared with the structure in which the fuel pressure sensor 20*a* is provided to the common rail 12. Therefore, the pressure fluctuation (transition waveform) in the nozzle holes 20*f* can be specifically detected with sufficient accuracy (S21). The fluctuation mode (transition waveform) of the detected pressure, which is assumed when the normal injection is performed, is calculated from the injection start instruction time point Is, the injection end instruction time point Ie, and the injection period Tq (S22). The injection start instruction time point Is and the injection end instruction time point Ie are attributed to the injection instruction signal. The injection period Tq is specified by the time points Is, Ie. The assumed transition waveform is compared with the detected transition waveform (S23), and the fuel injection defect is detected based on the comparison result (S24).

Therefore, the defective injection can be quickly detected with sufficient accuracy compared with the conventional device, which indirectly detects the defective injection based on a defect, which appears in the target value of the feedback control.

Further, according to the present embodiment, the defective injection is detected based on the determination whether the conditions (a) to (f) are satisfied. Therefore, the defective information can be included in the defect signal. Thus, notification of necessity of immediate exchange of the injector 20, prohibition of the output of the injection instruction signal to the corresponding injector 20 so as to steadily stop the fuel injection, and/or the like as a counter-defect processing can be performed adaptively to the present defect.

Other Embodiments

The present invention is not limited to the above embodiment. The features of the embodiment may be arbitrarily combined.

According to the embodiment, in the condition (d) in FIG. 9, the fourth predetermined period T14 starts from the pressure change point P4 (R4). Alternatively, for example, the fourth predetermined period T14 may be started from the pressure change point P3 (R3). However, in this case, the determination of the defective injection is made in the case where the injection rate increase rate Rα is not sufficiently large and the condition (d) is not satisfied. Therefore, it cannot be determined which the defect of the injection rate increase rate Rα or the defect of the maximum injection rate Rβ is the cause of the present defect. In the embodiment, the fourth predetermined period T14 is started from the pressure change point P3 (R3). Therefore, when the condition (d) is not satisfied and the defect injection is determined, the cause of the present defect can be determined to be the maximum injection rate Rβ.

According to the embodiment, the fuel injection is determined to be normal when all the conditions (a) to (f) are satisfied. Alternatively, the fuel injection may be determined to be normal when one of the conditions (a) to (f) is satisfied or when at least two of the conditions (a) to (f) are satisfied.

In the processing of step S23 in FIG. 4, a defective injection may be detected on the basis of a determination whether the injection rate, which is estimated from the detected pressure of the fuel pressure sensor 20*a*, is in a fluctuation mode of the normal range. Alternatively, a defective injection may be detected on the basis of a determination whether the detected pressure of the fuel pressure sensor 20*a* is in a fluctuation mode of the normal range, instead of the determination of the injection rate. The injector 20 may be provided with a piezo actuator, instead of the solenoid actuator shown in FIG. 2. A direct-acting injector may be also used. The direct-acting injector is operated without pressure leak from the leak hole 24 or the like, and a hydraulic pressure chamber Cd is not used to transmit driving power. The direct-acting injector may be a direct-acting piezo injector developed in recent years, for example. When the direct-acting injector is employed, the injection rate can be easily controlled.

In the above embodiment, the fuel pressure sensor 20*a* is mounted to the fuel inlet hole 22 of the injector 20. Alternatively, as shown by the dashed dotted line 200*a* in FIG. 2, a fuel pressure sensor 200*a* may be mounted to the inside of the housing 20*e*, and fuel pressure in the fuel passage 25, which extends from the fuel inlet hole 22 to the nozzle holes 20*f*, may be detected.

Further in the case where the fuel inlet hole 22 is mounted with the pressure sensor as described above, the mounting structure of the fuel pressure sensor 20*a* can be simplified, compared with the structure in which the inside of the housing 20*e* is mounted with the pressure sensor. On the other hand, in the structure in which the inside of the housing 20*e* is mounted with the pressure sensor, the location of the fuel pressure sensor 20*a* is closer to the nozzle holes 20*f*, compared with the structure in which the fuel inlet hole 22 is mounted with the pressure sensor. Therefore, pressure fluctuation in the nozzle holes 20*f* can be further properly detected.

The fuel pressure sensor 20*a* may be mounted to the high-pressure pipe 14. In this case, the fuel pressure sensor 20*a* is preferably mounted to the location at a predetermined distance from the common rail 12.

A flow regulating unit may be provided to a connection between the common rail 12 and the high-pressure pipe 14 for regulating fuel flow from the common rail 12 to the high-pressure pipe 14. The present flow regulating unit is configured to blockade the passage when excessive fuel outflow is caused by, for example, fuel leak due to damage in the high-pressure pipe 14, the injector 20, or the like. For example, the flow regulating unit may be a valve element such as a ball element, which is configured to blockade the passage in the case of excessive flow. A flow damper, which is constructed by integrating the orifice 12*a* (fuel pulsation reducing unit) with the flow regulating unit, may be employed.

The fuel pressure sensor 20*a* may be located downstream of the orifice and the flow regulating unit with respect to the fuel flow. Alternatively, the fuel pressure sensor 20*a* may be located downstream of at least one of the orifices and the flow regulating unit.

The number of the fuel pressure sensor 20*a* may be arbitrary determined. For example, two or more sensors may be provided to a fuel passage for one cylinder.

It is also effective to additionally provide a rail pressure sensor for detecting pressure in the common rail 12, in addition to the fuel pressure sensor 20*a*.

The type of the engine and the system configuration as the controlled object may be also arbitrary changed according to the application or the like. According to the embodiment, the device and system are applied to the diesel engine as one example. Alternatively, the device and system are applicable to a spark ignition gasoline engine, in particular a direct-injection engine, for example. In a fuel injection system for a direct fuel-injection gasoline engine, a delivery pipe is provided for storing gasoline at high-pressure. In this case, high-pressure fuel is fed from the fuel pump to the delivery pipe, and the high-pressure fuel is distributed from the delivery pipe to the multiple injectors 20 and injected into the combustion chambers of the engine. In such a system, the delivery pipe is equivalent to the pressure-accumulation vessel. The device and system are not limited to be used for the control of a fuel injection valve, which injects fuel directly in a cylinder. The device and system may be used for a fuel injection valve, which injects fuel to an engine intake passage or an exhaust passage.

As described above, according to an aspect 1, a defective injection detection device for a fuel injection system configured to inject fuel, which is accumulated in a pressure-accumulation vessel 12, from a fuel injection valve 20, the defective injection detection device includes a pressure sensor 20*a* located in a fuel passage 25, which extends from the pressure-accumulation vessel 12 to a nozzle hole 20*f* of the fuel injection valve 20, and configured to detect pressure, which is fluctuated by injection of fuel through the nozzle hole 20*f*, the pressure sensor 20*a* being located closer to a nozzle hole 20*f* than the pressure-accumulation vessel 12. The defective injection detection device further includes an instruction signal output means S13 for outputting an injection instruction signal so as to instruct an injection mode of fuel to the fuel injection valve 20. The defective injection detection device further includes a defective injection determination means S23, S24 for determining whether a detected pressure of the fuel pressure sensor 20*a* is fluctuated in a fluctuation mode in a range assumed from the injection instruction signal. The defective injection determination means S23, S24 is configured to determine that the defective injection occurs when determining that the detected pressure is out of the fluctuation mode in the assumed range.

Pressure of fuel in the nozzle hole of the fuel injection valve is changed through the injection of fuel. The pressure fluctuation in such a nozzle hole and an actual injection state therebetween have a strong correlation. For example, start of decrease in pressure in the nozzle hole is accompanied with the actual injection start. The inventor noted the present subject and conducted a study to specifically detect the actual injection state by detecting the pressure fluctuation. However, in the fuel injection system according to JP-A-5-52146, the fuel pressure sensor as the rail pressure sensor is located at the pressure-accumulation vessel for detecting pressure of fuel in the pressure-accumulation vessel. Accordingly, the pressure fluctuation attributed to the injection may be attenuated within the pressure-accumulation vessel. Therefore, it is difficult to detect the pressure fluctuation with sufficient accuracy in such a conventional system.

According to the above embodiments, the fuel pressure sensor is located in the fuel passage, which extends from the pressure-accumulation vessel to the nozzle hole of the fuel injection valve. The pressure sensor is located closer to the nozzle hole than the pressure-accumulation vessel. Therefore, the pressure sensor is capable of detecting pressure in the nozzle hole, before the pressure is attenuated in the pressure-accumulation vessel. Therefore, the pressure fluctuation attributed to the injection can be detected with sufficient accuracy. Thus, the actual injection state can be specifically detected based on the detection result.

In addition to the arrangement of the fuel sensor so as to specifically detect the injection state, the present defective injection detection device determines whether the detected pressure of the fuel pressure sensor is fluctuated in the fluctuation mode in the range assumed from the injection instruction signal. The defective injection determination means is configured to determine that the defective injection occurs when determining that the detected pressure is out of the fluctuation mode in the assumed range. Therefore, the defective injection can be quickly detected with sufficient accuracy compared with the conventional device of JP-A-5-52146, which indirectly detects the defective injection based on a defect, which appears in the target value of the feedback control.

According to any one of aspects 2 to 15 described below, various correlations between changes, which appear in the transition waveform of the detected pressure, and changes in actual injection states are noted. FIG. 5 referred in the subsequent description is the time chart showing the correlation between the injection rate (injection quantity per unit time) and the transition waveform of the detected pressure of the fuel pressure sensor, when a defective injection does not occur. Each of FIGS. 6 to 12 schematically shows the injection rate. In each of FIGS. 6 to 12, the dashed dotted line indicates the injection rate in the normal injection, and the solid line indicates the injection rate when a defective injection occurs.

As shown in FIGS. 5, 6, in the case of the normal injection, the injection of fuel through the nozzle hole is started in the first predetermined period T11, which starts from the injection start instruction time point Is, and the injection rate starts increasing at the transition point R3. The detected pressure of the fuel pressure sensor starts decreasing at the transition point P3, since the injection rate starts increasing at the time point R3. Therefore, by noting the correlation between the transition points R3, P3, the actual injection start can be detected based on the transition point P3 appearing in the transition waveform of the detected pressure.

In view of the foregoing, according to an aspect 2, the defective injection detection device includes injection start detection means 30 for detecting start of pressure decrease appearing in the transition waveform of the detected pressure, the pressure decrease being attributed to actual injection start. The defective injection determination means S23, S24 determines that the detected pressure is out of the fluctuation mode in the assumed range when the start of the pressure decrease is not detected in the first period T11, which starts from the injection start instruction time point Is of the injection instruction signal. Therefore, the defective injection can be suitably detected.

According to the aspect 2, information, which indicates a high possibility of the defective state where the injection is not performed in contradiction to the injection start instruction, can be obtained. Therefore, according to an aspect 3, the defective injection detection device includes defect signal output means S25 for outputting a defect signal when the defective injection determination means S23, S24 determines that the defective injection occurs. The defect signal includes information indicating a possibility of a defective state where the injection is not performed in contradiction to the injection start instruction. In the present structure, a successive operation in response to the defective injection can be performed referring to the information.

As show in FIGS. 5, 7, in the case of the normal injection, the fuel injection through the nozzle holes is completed in the second predetermined period T12, which starts from the injection end instruction time point Ie. In this case, the injection rate, which continues decreasing from the transition point R7, stops the decreasing at the transition point R8. The detected pressure of the fuel pressure sensor stops increasing at the transition point P8, since the injection rate stops decreasing at the time point R8. Therefore, by noting the correlation between the transition points R8, P8, the actual injection end can be detected based on the transition point P8 appearing in the transition waveform of the detected pressure.

In view of the foregoing, according to an aspect 4, the defective injection detection device includes injection end detection means 30 for detecting end of pressure increase appearing in the transition waveform OT the detected pressure, the pressure increase being attributed to actual injection stop. The defective injection determination means S23, S24 determines that the detected pressure is out of the fluctuation mode in the assumed range when the end of the pressure increase is not detected in a second predetermined period T12, which starts from an injection end instruction time point Ie of the injection instruction signal. Therefore, the defective injection can be suitably detected.

According to the aspect 4, information, which indicates a high possibility of the defective state where the injection continues in contradiction to the injection end instruction, can be obtained. Therefore, according to an aspect 5, the defective injection detection device includes defect signal output means S25 for outputting a defect signal when the defective injection determination means S23, S24 determines that the defective injection occurs. The defect signal includes information indicating a possibility of a defective state where the injection continues in contradiction to the injection end instruction. In the present structure, a successive operation in response to the defective injection can be performed referring to the information.

As show in FIGS. 5, 8, in the case of the normal injection, the injection rate, which is at the maximum injection rate, starts decreasing at the transition point R7 in the third predetermined period T13, which starts from the injection end instruction time point Ie, and the detected pressure of the fuel pressure sensor starts increasing at the transition point P7, since the injection rate starts decreasing. Therefore, by noting the correlation between the transition points R7, P7, the actual start of the injection rate decrease can be detected based on the transition point P7 appearing in the transition waveform of the detected pressure.

In view of the foregoing, according to an aspect 6, the defective injection detection device includes injection-end-operation-start detection means 30 for detecting start of pressure increase appearing in the transition waveform of the detected pressure, the pressure increase being attributed to actual injection rate decrease caused by start of an injection end operation. The defective injection determination means S23, S24 determines that the detected pressure is out of the fluctuation mode in the assumed range when the start of the pressure increase is not detected in a third predetermined period T13, which starts from an injection end instruction time point Ie of the injection instruction signal. Therefore, the defective injection can be suitably detected.

According to the aspect 6, information, which indicates a high possibility of the defective state where the injection rate decrease does not start in contradiction to the injection end instruction, can be obtained. Therefore, according to an aspect 7, the defective injection detection device includes defect signal output means S25 for outputting a defect signal when the defective injection determination means S23, S24 determines that the defective injection occurs. The defect signal includes information indicating a possibility of a defective state where the actual injection rate decrease does not start in contradiction to the injection end instruction. In the present structure, a successive operation in response to the defective injection can be performed referring to the information.

As shown in FIGS. 5, 9, as the increase of the injection rate (maximum injection rate Rβ) attributed to the injection start becomes large, the decreases Pβ in detected pressure attributed to the injection start from the transition point P3 becomes large. Therefore, by noting the correlation between the transition points Rβ, Pβ, the actual maximum injection rate Rβ can be detected based on the decrease Pβ appearing in the transition waveform of the detected pressure.

In view of the foregoing, according to an aspect 8, the defective injection detection device includes maximum-injection-rate-reach detection means 30 for detecting pressure decrease end appearing in the transition waveform of the detected pressure, the pressure decrease end being attributed to maximum injection rate reach subsequent to actual injection start. The defective injection determination means S23, S24 determines that the detected pressure is out of the fluctuation mode in the assumed range when the detected pressure does not exceed a threshold in a fourth predetermined period T14, which starts from the maximum injection rate reach. Therefore, the defective injection can be suitably detected.

According to the aspect 8, information, which indicates a high possibility of the defective state where the injection rate does not sufficiently increase to an instructed maximum injection rate, can be obtained. Therefore, according to an aspect 9, the defective injection detection device includes defect signal output means S25 for outputting a defect signal when the defective injection determination means S23, S24 determines that the defective injection occurs. The defect signal includes information indicating a possibility of a defective state where the injection rate does not sufficiently increase to an instructed maximum injection rate. In the present structure, a successive operation in response to the defective injection can be performed referring to the information.

As show in FIGS. 5, 10, the increase rate Rα, when the injection rate increases from the transition point R3 in response to the injection start, the decrease rate Pα, when the detected pressure decreases from the transition point P3 in response to the injection start, correlate with each other. As the injection rate quickly increases when the increase rate Rα is large, the decrease rate Pα becomes large, and the detected pressure quickly decreases. Therefore, by noting the correlation between the increase and decrease rates Rα, Pα, the actual increase rate Rα of injection rate can be detected based on the decrease rate Pα appearing in the transition waveform of the detected pressure. In view of the foregoing, according to an aspect 10, the defective injection detection device includes injection-rate-increase detection means 30 for detecting a rate Pα of pressure decrease appearing in the transition waveform of the detected pressure, the pressure decrease being attributed to injection rate increase subsequent to actual injection start. The defective injection determination means S23, S24 determines that the detected pressure is out of the fluctuation mode in the assumed range when the rate Pα of pressure decrease is less than a predetermined decrease rate Pα1. Therefore, the defective injection can be suitably detected.

According to the aspect 10, information, which indicates a high possibility of the defective state where an increase rate Rα of an actual injection rate is less than an instructed increase rate. Therefore, according to an aspect 1 the defective injection detection device includes injection quantity calculating means 30 for calculating an integral value of pressure correspondingly to injection quantity S in a portion of the transition waveform of the detected pressure, the portion corresponding to an injection rate change between an actual injection start and an actual injection end. The defective injection determination means S23, S24 determines that the detected pressure is out of the fluctuation mode in the assumed range when the injection quantity S calculated by the injection quantity calculating means 30 is less than a lower limit. In the present structure, a successive operation in response to the defective injection can be performed referring to the information.

As shown in FIGS. 5, 11, the integral value of the injection rate between the actual injection start and the actual injection end is equivalent to the injection quantity. The integral value as the injection quantity is indicated by the hatched area S. A portion of the transition waveform of the detected pressure between the transition points P3 to P8 corresponds to the injection rate change between the actual injection start and the actual injection end. The integral value of the pressure of the portion between the transition points P3 to P8 and the integral value S of the injection rate therebetween have a correlation. As the integral value of the pressure becomes large, the integral value S of the injection rate becomes large. Therefore, by noting the correlation between the integrated values, the actual injection quantity S can be detected based on the integrated value calculated from the transition waveform of the detected pressure.

In view of the foregoing, according to an aspect 12, the defective injection detection device includes injection quantity calculating means 30 for calculating an integral value of pressure correspondingly to injection quantity S in a portion of the transition waveform of the detected pressure, the portion corresponding to an injection rate change between an actual injection start and an actual injection end. The defective injection determination means S23, S24 determines that the detected pressure is out of the fluctuation mode in the assumed range when the injection quantity S calculated by the injection quantity calculating means 30 is less than a lower limit. According to an aspect 14, the defective injection detection device includes injection quantity calculating means 30 for calculating an integral value of pressure correspondingly to injection quantity S in a portion of the transition waveform of the detected pressure, the portion corresponding to an injection rate change between an actual injection start and an actual injection end. The defective injection determination means S23, S24 determines that the detected pressure is out of the fluctuation mode in the assumed range when the injection quantity S calculated by the injection quantity calculating means 30 is greater than an upper limit. Therefore, the defective injection can be suitably detected.

According to the aspect 12, information, which indicates a high possibility of the defective state where an actual injection quantity is insufficient compared with an instructed injection quantity. According to the aspect 14, information, which indicates a high possibility of the defective state where an actual injection quantity is excessive compared with an instructed injection quantity. Therefore, according to an aspect 13, the defective injection detection device includes defect signal output means S25 for outputting a defect signal when the defective injection determination means S23, S24 determines that the defective injection occurs. The defect signal includes information indicating a possibility of a defective state where an actual injection quantity is insufficient compared with an instructed injection quantity. According to an aspect 15, the defective injection detection device includes defect signal output means S25 for outputting a defect signal when the defective injection determination means S23, S24 determines that the defective injection occurs. The defect signal includes information indicating a possibility of a defective state where an actual injection quantity is excessive compared with an instructed injection quantity. In the present structure, a successive operation in response to the defective injection can be performed referring to the information.

According to an aspect 16, the fuel pressure sensor is provided to the fuel injection valve. Therefore, in the present structure, the location of the fuel pressure sensor is closer to the nozzle hole, compared with the structure in which the fuel pressure sensor is mounted to the high-pressure pipe, which connects the pressure-accumulating vessel with the injector. Therefore, pressure fluctuation at the nozzle holes can be further accurately detected, compared with a structure in which the pressure fluctuation, which has been attenuated through the high-pressure pipe, is detected.

The fuel pressure sensor is mounted to the fuel injection valve. According to an aspect 17, the pressure sensor 20*a* is located at a fuel inlet hole 22 of the fuel injection valve 20. According to an aspect 18, the pressure sensor 20*a* is located in the fuel injection valve 20 for detecting pressure of fuel in an inner fuel passage 25, which extends from the fuel inlet hole 22 to the nozzle hole 20*f*.

Further in the case where the fuel inlet hole is mounted with the fuel pressure sensor as described above, the mounting structure of the fuel pressure sensor can be simplified, compared with the structure in which the inside of the fuel injection valve is mounted with the fuel pressure sensor. On the other hand, in the structure in which the inside of the fuel injection valve is mounted with the fuel pressure sensor, the location of the fuel pressure sensor is closer to the injection holes, compared with the structure in which the fuel inlet hole is mounted with the fuel pressure sensor. Therefore, pressure fluctuation in the injection holes can be further properly detected.

According to an aspect 19, an orifice 12*a* is located in the fuel passage 25, which extends from the pressure-accumulation vessel 12 to a fuel inlet hole 22 for attenuating pulsation in pressure of fuel flowing from the pressure-accumulation vessel 12. The fuel pressure sensor 20*a* is located downstream of the orifice 12*a* with respect to fuel flow. In the case where the fuel pressure sensor is located upstream of the orifice, fluctuation in pressure, which has been attenuated through the orifice, is detected. By contrast, according to the aspect 19, the fuel pressure sensor is located downstream of the orifice. Therefore, pressure fluctuation can be detected before being attenuated through the orifice. Therefore, pressure fluctuation in the nozzle hole can be further properly detected.

According to an aspect 20, a fuel injection system includes the defective injection detection device and at least one of the pressure-accumulation vessel 12 for pressure-accumulating fuel and a fuel injection valve 20 for injecting fuel, which is pressure-accumulated in the pressure-accumulation vessel 12. The fuel injection system is capable of producing the above various effects.

The above structures of the embodiments can be combined as appropriate.

The above processings such as calculations and determinations are not limited being executed by the ECU 30. The control unit may have various structures including the ECU 30 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A defective injection detection device for a fuel injection system configured to inject fuel, which is accumulated in a pressure-accumulation vessel, from a fuel injection valve, the defective injection detection device comprising:

a pressure sensor located in a fuel passage, which extends from the pressure-accumulation vessel to a nozzle hole of the fuel injection valve, and configured to detect pressure, which is fluctuated by injection of fuel through the nozzle hole, the pressure sensor being located closer to a nozzle hole than the pressure-accumulation vessel;

instruction signal output means for outputting an injection instruction signal so as to instruct an injection mode of fuel to the fuel injection valve;

defective injection determination means for determining whether a detected pressure of the fuel pressure sensor is fluctuated in a fluctuation mode in a range assumed from the injection instruction signal; and injection start detection means for detecting start of pressure decrease appearing in the transition waveform of the detected pressure, the pressure decrease being attributed to actual injection start, wherein the defective injection determination means is configured to determine that a defective injection occurs when determining that the detected pressure is out of the fluctuation mode in the assumed range, wherein the defective injection determination means determines that the detected pressure is out of the fluctuation mode in the assumed range when the start of the pressure decrease is not detected in a first period, which starts from an injection start instruction time point of the injection instruction signal.

2. The defective injection detection device according to claim 1, further comprising:

defect signal output means for outputting a defect signal when the defective injection determination means determines that the defective injection occurs, wherein the defect signal includes information indicating a possibility of a defective state where the injection is not performed in contradiction to the injection start instruction.

3. The defective injection detection device according to claim 1, further comprising:

injection quantity calculating means for calculating an integral value of pressure correspondingly to injection quantity in a portion of the transition waveform of the detected pressure, the portion corresponding to an injection rate change between an actual injection start and an actual injection end, wherein the defective injection determination means determines that the detected pressure is out of the fluctuation mode in the assumed range when the injection quantity calculated by the injection quantity calculating means is greater than an upper limit.

4. The defective injection detection device according to claim 3, further comprising:

defect signal output means for outputting a defect signal when the defective injection determination means determines that the defective injection occurs, wherein the defect signal includes information indicating a possibility of a defective state where an actual injection quantity is excessive compared with an instructed injection quantity.

5. The defective injection detection device according to claim 1, wherein the fuel pressure sensor is provided to the fuel injection valve.

6. The defective injection detection device according to claim 5, wherein the fuel pressure sensor is located at a fuel inlet hole of the fuel injection valve.

7. The defective injection detection device according to claim 5, wherein the fuel pressure sensor is located in a fuel injection valve and configured to detect pressure of fuel in an inner fuel passage, which extends from a fuel inlet hole to the nozzle hole.

8. The defective injection detection device according to claim 1, further comprising:

an orifice located in the fuel passage, which extends from the pressure-accumulation vessel to a fuel inlet hole for attenuating pulsation in pressure of fuel flowing from the pressure-accumulation vessel, wherein the fuel pressure sensor is located downstream of the orifice with respect to fuel flow.

9. A fuel injection system comprising:

the defective injection detection device according to claim 1; and at least one of the pressure-accumulation vessel for pressure-accumulating fuel and a fuel injection valve for injecting fuel, which is pressure-accumulated in the pressure-accumulation vessel.

10. A defective injection detection device for a fuel injection system configured to inject fuel, which is accumulated in a pressure-accumulation vessel, from a fuel injection valve, the defective injection detection device comprising:

a pressure sensor located in a fuel passage, which extends from the pressure-accumulation vessel to a nozzle hole of the fuel injection valve, and configured to detect pressure, which is fluctuated by injection of fuel through the nozzle hole, the pressure sensor being located closer to a nozzle hole than the pressure-accumulation vessel;

instruction signal output means for outputting an injection instruction signal so as to instruct an injection mode of fuel to the fuel injection valve;

defective injection determination means for determining whether a detected pressure of the fuel pressure sensor is fluctuated in a fluctuation mode in a range assumed from the injection instruction signal; and injection end detection means for detecting end of pressure increase appearing in the transition waveform of the detected pressure, the pressure increase being attributed to actual injection stop, wherein the defective injection determination means is configured to determine that a defective injection occurs when determining that the detected pressure is out of the fluctuation mode in the assumed range, wherein the defective injection determination means determines that the detected pressure is out of the fluctuation mode in the assumed range when the end of the pressure increase is not detected in a second predetermined period, which starts from an injection end instruction time point of the injection instruction signal.

11. The defective injection detection device according to claim 10, further comprising:

defect signal output means for outputting a defect signal when the defective injection determination means determines that the defective injection occurs, wherein the defect signal includes information indicating a possibility of a defective state where the injection continues in contradiction to the injection end instruction.

12. The defective injection detection device according to claim 10, further comprising:

injection quantity calculating means for calculating an integral value of pressure correspondingly to injection quantity in a portion of the transition waveform of the detected pressure, the portion corresponding to an injection rate change between an actual injection start and an actual injection end, wherein the defective injection determination means determines that the detected pressure is out of the fluctuation mode in the assumed range when the injection quantity calculated by the injection quantity calculating means is greater than an upper limit.

13. The defective injection detection device according to claim 12, further comprising:

defect signal output means for outputting a defect signal when the defective injection determination means determines that the defective injection occurs, wherein the defect signal includes information indicating a possibility of a defective state where an actual injection quantity is excessive compared with an instructed injection quantity.

14. The defective injection detection device according to claim 10, wherein the fuel pressure sensor is provided to the fuel injection valve.

15. The defective injection detection device according to claim 14, wherein the fuel pressure sensor is located at a fuel inlet hole of the fuel injection valve.

16. The defective injection detection device according to claim 14, wherein the fuel pressure sensor is located in a fuel injection valve and configured to detect pressure of fuel in an inner fuel passage, which extends from a fuel inlet hole to the nozzle hole.

17. The defective injection detection device according to claim 10, further comprising:

an orifice located in the fuel passage, which extends from the pressure-accumulation vessel to a fuel inlet hole for attenuating pulsation in pressure of fuel flowing from the pressure-accumulation vessel, wherein the fuel pressure sensor is located downstream of the orifice with respect to fuel flow.

18. A fuel injection system comprising:

the defective injection detection device according to claim 10; and at least one of the pressure-accumulation vessel for pressure-accumulating fuel and a fuel injection valve for injecting fuel, which is pressure-accumulated in the pressure-accumulation vessel.

19. A defective injection detection device for a fuel injection system configured to inject fuel, which is accumulated in a pressure-accumulation vessel, from a fuel injection valve, the defective injection detection device comprising:

a pressure sensor located in a fuel passage, which extends from the pressure-accumulation vessel to a nozzle hole of the fuel injection valve, and configured to detect pressure, which is fluctuated by injection of fuel through the nozzle hole, the pressure sensor being located closer to a nozzle hole than the pressure-accumulation vessel;

instruction signal output means for outputting an injection instruction signal so as to instruct an injection mode of fuel to the fuel injection valve;

defective injection determination means for determining whether a detected pressure of the fuel pressure sensor is fluctuated in a fluctuation mode in a range assumed from the injection instruction signal; and injection-end-operation-start detection means for detecting start of pressure increase appearing in the transition waveform of the detected pressure, the pressure increase being attributed to actual injection rate decrease caused by start of an injection end operation, wherein the defective injection determination means is configured to determine that a defective injection occurs when determining that the detected pressure is out of the fluctuation mode in the assumed range, wherein the defective injection determination means determines that the detected pressure is out of the fluctuation mode in the assumed range when the start of the pressure increase is not detected in a third predetermined period, which starts from an injection end instruction time point of the injection instruction signal.

20. The defective injection detection device according to claim 19, further comprising:

defect signal output means for outputting a defect signal when the defective injection determination means determines that the defective injection occurs, wherein the defect signal includes information indicating a possibility of a defective state where the actual injection rate decrease does not start in contradiction to the injection end instruction.

21. The defective injection detection device according to claim 19, further comprising:

injection quantity calculating means for calculating an integral value of pressure correspondingly to injection quantity in a portion of the transition waveform of the detected pressure, the portion corresponding to an injection rate change between an actual injection start and an actual injection end, wherein the defective injection determination means determines that the detected pressure is out of the fluctuation mode in the assumed range when the injection quantity calculated by the injection quantity calculating means is greater than an upper limit.

22. The defective injection detection device according to claim 21, further comprising:

defect signal output means for outputting a defect signal when the defective injection determination means determines that the defective injection occurs, wherein the defect signal includes information indicating a possibility of a defective state where an actual injection quantity is excessive compared with an instructed injection quantity.

23. The defective injection detection device according to claim 19, wherein the fuel pressure sensor is provided to the fuel injection valve.

24. The defective injection detection device according to claim 23, wherein the fuel pressure sensor is located at a fuel inlet hole of the fuel injection valve.

25. The defective injection detection device according to claim 23, wherein the fuel pressure sensor is located in a fuel injection valve and configured to detect pressure of fuel in an inner fuel passage, which extends from a fuel inlet hole to the nozzle hole.

26. The defective injection detection device according to claim 19, further comprising:

an orifice located in the fuel passage, which extends from the pressure-accumulation vessel to a fuel inlet hole for attenuating pulsation in pressure of fuel flowing from the pressure-accumulation vessel, wherein the fuel pressure sensor is located downstream of the orifice with respect to fuel flow.

27. A fuel injection system comprising:

the defective injection detection device according to claim 19; and at least one of the pressure-accumulation vessel for pressure-accumulating fuel and a fuel injection valve for injecting fuel, which is pressure-accumulated in the pressure-accumulation vessel.

28. A defective injection detection device for a fuel injection system configured to inject fuel, which is accumulated in a pressure-accumulation vessel, from a fuel injection valve, the defective injection detection device comprising:

a pressure sensor located in a fuel passage, which extends from the pressure-accumulation vessel to a nozzle hole of the fuel injection valve, and configured to detect pressure, which is fluctuated by injection of fuel through the nozzle hole, the pressure sensor being located closer to a nozzle hole than the pressure-accumulation vessel;

instruction signal output means for outputting an injection instruction signal so as to instruct an injection mode of fuel to the fuel injection valve;

defective injection determination means for determining whether a detected pressure of the fuel pressure sensor is fluctuated in a fluctuation mode in a range assumed from the injection instruction signal; and maximum-injection-rate-reach detection means for detecting pressure decrease end appearing in the transition waveform of the detected pressure, the pressure decrease end being attributed to maximum injection rate reach subsequent to actual injection start, wherein the defective injection determination means is configured to determine that a defective injection occurs when determining that the detected pressure is out of the fluctuation mode in the assumed range, wherein the defective injection determination means determines that the detected pressure is out of the fluctuation mode in the assumed range when the detected pressure does not exceed a threshold in a fourth predetermined period, which starts from the maximum injection rate reach.

29. The defective injection detection device according to claim 28, further comprising:

defect signal output means for outputting a defect signal when the defective injection determination means determines that the defective injection occurs, wherein the defect signal includes information indicating a possibility of a defective state where the injection rate does not sufficiently increase to an instructed maximum injection rate.

30. The defective injection detection device according to claim 28, further comprising:

injection quantity calculating means for calculating an integral value of pressure correspondingly to injection quantity in a portion of the transition waveform of the detected pressure, the portion corresponding to an injection rate change between an actual injection start and an actual injection end, wherein the defective injection determination means determines that the detected pressure is out of the fluctuation mode in the assumed range when the injection quantity calculated by the injection quantity calculating means is greater than an upper limit.

31. The defective injection detection device according to claim 30, further comprising:

defect signal output means for outputting a defect signal when the defective injection determination means determines that the defective injection occurs, wherein the defect signal includes information indicating a possibility of a defective state where an actual injection quantity is excessive compared with an instructed injection quantity.

32. The defective injection detection device according to claim 28, wherein the fuel pressure sensor is provided to the fuel injection valve.

33. The defective injection detection device according to claim 32, wherein the fuel pressure sensor is located at a fuel inlet hole of the fuel injection valve.

34. The defective injection detection device according to claim 32, wherein the fuel pressure sensor is located in a fuel injection valve and configured to detect pressure of fuel in an inner fuel passage, which extends from a fuel inlet hole to the nozzle hole.

35. The defective injection detection device according to claim 28, further comprising:

an orifice located in the fuel passage, which extends from the pressure-accumulation vessel to a fuel inlet hole for attenuating pulsation in pressure of fuel flowing from the pressure-accumulation vessel, wherein the fuel pressure sensor is located downstream of the orifice with respect to fuel flow.

36. A fuel injection system comprising:

the defective injection detection device according to claim 28; and at least one of the pressure-accumulation vessel for pressure-accumulating fuel and a fuel injection valve for injecting fuel, which is pressure-accumulated in the pressure-accumulation vessel.

37. A defective injection detection device for a fuel injection system configured to inject fuel, which is accumulated in a pressure-accumulation vessel, from a fuel injection valve, the defective injection detection device comprising:

a pressure sensor located in a fuel passage, which extends from the pressure-accumulation vessel to a nozzle hole of the fuel injection valve, and configured to detect pressure, which is fluctuated by injection of fuel through the nozzle hole, the pressure sensor being located closer to a nozzle hole than the pressure-accumulation vessel;

instruction signal output means for outputting an injection instruction signal so as to instruct an injection mode of fuel to the fuel injection valve;

defective injection determination means for determining whether a detected pressure of the fuel pressure sensor is fluctuated in a fluctuation mode in a range assumed from the injection instruction signal; and injection-rate-increase detection means for detecting a rate of pressure decrease appearing in the transition waveform of the detected pressure, the pressure decrease being attributed to injection rate increase subsequent to actual injection start, wherein the defective injection determination means is configured to determine that a defective injection occurs when determining that the detected pressure is out of the fluctuation mode in the assumed range, wherein the defective injection determination means determines that the detected pressure is out of the fluctuation mode in the assumed range when the rate of pressure decrease is less than a predetermined decrease rate.

38. The defective injection detection device according to claim 37, further comprising:

defect signal output means for outputting a defect signal when the defective injection determination means determines that the defective injection occurs, wherein the defect signal includes information indicating a possibility of a defective state where an increase rate of an actual injection rate is less than an instructed increase rate.

39. The defective injection detection device according to claim 37, further comprising:

injection quantity calculating means for calculating an integral value of pressure correspondingly to injection quantity in a portion of the transition waveform of the detected pressure, the portion corresponding to an injection rate change between an actual injection start and an actual injection end, wherein the defective injection determination means determines that the detected pressure is out of the fluctuation mode in the assumed range when the injection quantity calculated by the injection quantity calculating means is greater than an upper limit.

40. The defective injection detection device according to claim 39, further comprising:

defect signal output means for outputting a defect signal when the defective injection determination means determines that the defective injection occurs, wherein the defect signal includes information indicating a possibility of a defective state where an actual injection quantity is excessive compared with an instructed injection quantity.

41. The defective injection detection device according to claim 37, wherein the fuel pressure sensor is provided to the fuel injection valve.

42. The defective injection detection device according to claim 41, wherein the fuel pressure sensor is located at a fuel inlet hole of the fuel injection valve.

43. The defective injection detection device according to claim 41, wherein the fuel pressure sensor is located in a fuel injection valve and configured to detect pressure of fuel in an inner fuel passage, which extends from a fuel inlet hole to the nozzle hole.

44. The defective injection detection device according to claim 37, further comprising:

an orifice located in the fuel passage, which extends from the pressure-accumulation vessel to a fuel inlet hole for attenuating pulsation in pressure of fuel flowing from the pressure-accumulation vessel, wherein the fuel pressure sensor is located downstream of the orifice with respect to fuel flow.

45. A fuel injection system comprising:

the defective injection detection device according to claim 37; and at least one of the pressure-accumulation vessel for pressure-accumulating fuel and a fuel injection valve for injecting fuel, which is pressure-accumulated in the pressure-accumulation vessel.

46. A defective injection detection device for a fuel injection system configured to inject fuel, which is accumulated in a pressure-accumulation vessel, from a fuel injection valve, the defective injection detection device comprising:

a pressure sensor located in a fuel passage, which extends from the pressure-accumulation vessel to a nozzle hole of the fuel injection valve, and configured to detect pressure, which is fluctuated by injection of fuel through the nozzle hole, the pressure sensor being located closer to a nozzle hole than the pressure-accumulation vessel;

instruction signal output means for outputting an injection instruction signal so as to instruct an injection mode of fuel to the fuel injection valve;

defective injection determination means for determining whether a detected pressure of the fuel pressure sensor is fluctuated in a fluctuation mode in a range assumed from the injection instruction signal; and injection quantity calculating means for calculating an integral value of pressure correspondingly to injection quantity in a portion of the transition waveform of the detected pressure, the portion corresponding to an injection rate change between an actual injection start and an actual injection end, wherein the defective injection determination means is configured to determine that a defective injection occurs when determining that the detected pressure is out of the fluctuation mode in the assumed range, wherein the defective injection determination means determines that the detected pressure is out of the fluctuation mode in the assumed range when the injection quantity calculated by the injection quantity calculating means is less than a lower limit.

47. The defective injection detection device according to claim 46, further comprising:

defect signal output means for outputting a defect signal when the defective injection determination means determines that the defective injection occurs, wherein the defect signal includes information indicating a possibility of a defective state where an actual injection quantity is insufficient compared with an instructed injection quantity.

48. The defective injection detection device according to claim 46, further comprising:

injection quantity calculating means for calculating an integral value of pressure correspondingly to injection quantity in a portion of the transition waveform of the detected pressure, the portion corresponding to an injection rate change between an actual injection start and an actual injection end, wherein the defective injection determination means determines that the detected pressure is out of the fluctuation mode in the assumed range when the injection quantity calculated by the injection quantity calculating means is greater than an upper limit.

49. The defective injection detection device according to claim 48, further comprising:

defect signal output means for outputting a defect signal when the defective injection determination means determines that the defective injection occurs, wherein the defect signal includes information indicating a possibility of a defective state where an actual injection quantity is excessive compared with an instructed injection quantity.

50. The defective injection detection device according to claim 46, wherein the fuel pressure sensor is provided to the fuel injection valve.

51. The defective injection detection device according to claim 50, wherein the fuel pressure sensor is located at a fuel inlet hole of the fuel injection valve.

52. The defective injection detection device according to claim 50, wherein the fuel pressure sensor is located in a fuel injection valve and configured to detect pressure of fuel in an inner fuel passage, which extends from a fuel inlet hole to the nozzle hole.

53. The defective injection detection device according to claim 46, further comprising:

an orifice located in the fuel passage, which extends from the pressure-accumulation vessel to a fuel inlet hole for attenuating pulsation in pressure of fuel flowing from the pressure-accumulation vessel, wherein the fuel pressure sensor is located downstream of the orifice with respect to fuel flow.

54. A fuel injection system comprising:

the defective injection detection device according to claim 46; and at least one of the pressure-accumulation vessel for pressure-accumulating fuel and a fuel injection valve for injecting fuel, which is pressure-accumulated in the pressure-accumulation vessel.

* * * * *